(12) United States Patent
Brown et al.

(10) Patent No.: US 11,781,668 B2
(45) Date of Patent: Oct. 10, 2023

(54) VALVE UNIT INCLUDING A REINFORCEMENT MECHANISM WITH OPTIONAL SENSOR ASSEMBLY

(71) Applicant: Terragauge LLC, Santa Barbara, CA (US)

(72) Inventors: Christopher Joseph Brown, Santa Barbara, CA (US); Najmeh Brown, Santa Barbara, CA (US)

(73) Assignee: Brown Hawk Technologies LLC, Santa Barbara, CA (US)

( * ) Notice: Subject to any disclaimer, the term of this patent is extended or adjusted under 35 U.S.C. 154(b) by 135 days.

(21) Appl. No.: 16/359,869

(22) Filed: Mar. 20, 2019

(65) Prior Publication Data

US 2019/0383414 A1 Dec. 19, 2019

Related U.S. Application Data

(60) Provisional application No. 62/686,800, filed on Jun. 19, 2018.

(51) Int. Cl.
| | |
|---|---|
| *F16K 29/00* | (2006.01) |
| *G05D 7/06* | (2006.01) |
| *F16K 15/06* | (2006.01) |
| *F16K 31/44* | (2006.01) |

(52) U.S. Cl.
CPC ............ *F16K 29/00* (2013.01); *F16K 15/063* (2013.01); *F16K 31/445* (2013.01); *G05D 7/0617* (2013.01)

(58) Field of Classification Search
CPC ...... F16K 31/445; F16K 29/00; G05D 7/0617
See application file for complete search history.

(56) References Cited

U.S. PATENT DOCUMENTS

| | | | | |
|---|---|---|---|---|
| 982,400 A | * | 1/1911 | Walker | F16K 15/063 251/285 |
| 2008/0308157 A1 | * | 12/2008 | Zhuang | F16K 37/0066 137/553 |
| 2014/0261714 A1 | * | 9/2014 | Burt | G05D 23/1919 137/79 |

FOREIGN PATENT DOCUMENTS

CN 101464168 A * 6/2009

* cited by examiner

*Primary Examiner* — Angelisa L. Hicks
(74) *Attorney, Agent, or Firm* — RM Reed Law PLLC

(57) ABSTRACT

A valve unit may include a valve and a sensor assembly coupled to the valve. The valve may include a check disk configured to move along a pre-determined path to contact a valve seat in a closed state and configured to decouple from the valve seat in an open state. The valve may also include a mechanism to restrain lateral movement of the check disk to prevent the check disk from sticking. The sensor assembly may include a position sensor configured to generate a first electrical signal related to movement of the check disk and may include circuitry coupled to the position sensor. The position sensor assembly may generate a reference signal to eliminate noise within the first electrical signal. The circuitry may determine fluid flow parameters including flow volume of liquid components and of gas components of the fluid mixture based on frequency components within the first electrical signal.

19 Claims, 15 Drawing Sheets

VALVE UNIT INCLUDING A REINFORCEMENT MECHANISM WITH OPTIONAL SENSOR ASSEMBLY

CROSS-REFERENCE TO RELATED APPLICATION(S)

The present disclosure is a non-provisional application of and claims priority to U.S. Provisional Application No. 62/686,800 filed on Jun. 19, 2018 and entitled "Valve Unit Including a Position Sensor Assembly", which is incorporated herein by reference in its entirety and for all purposes.

FIELD

The present disclosure is generally related to valves, and more particularly, to valves that are configured to operate over extended periods of time without sticking and that are configured for use in harsh environments including environments with fluid mixtures, such as a crude mixture of oil, water, entrained gas, and contaminants (such as the fluid mixture that is experienced at the well head of a crude oil production system). Further, the present disclosure is related to valves that may include integrated sensors that can measure a variety of parameters corresponding to the valve, including valve position, temperature, pressure, and various other parameters.

BACKGROUND

Valves are used in a variety of oil and gas industry applications as control or safety devices. One particular type of valve, called a "check valve," may be configured to permit fluid to flow or pressure to act in one direction only. Check valve designs can be tailored to specific fluid types and operating conditions. Some designs may be less tolerant of debris than others.

In the production of oil from wells, check valves may be used at the well head to prevent the crude mixture of oil, water, entrained gas, and contaminants (sand, debris, and so on) from flowing back down hole. In some instances, check valves may also be used at a junction where multiple oil conduits merge into a common pipeline.

The crude mixture produced from a well often includes water, oil, natural gas, and debris (including sand, pieces of rock, pieces of casing material, other particles, or any combination thereof). The debris can be a cause of failure in check valves. Often, in addition to causing wear to components of the valve unit, the debris can become lodged between the check disk of the valve and the valve seat or between a piston and the housing, holding the valve at least partially open. Because the fluid includes such debris, the check valves may require frequent maintenance and replacement, which can add significant costs to oil production in terms of replacement parts, worker salaries, down time, and loss of oil due to the oil flowing through the failed valve and back into the well from both the well of interest and from other wells sharing the common pipeline.

SUMMARY

Embodiments of a valve unit are described below that may reduce or eliminate valve failure due to debris becoming lodged between a check disk and the housing or between the check disk of the valve and the valve seat. In some implementations, a commercially available valve unit may be modified to include a reinforcement mechanism that may control or restrain lateral movement of the check disk of the valve, preventing sticking. For example, the reinforcement mechanism may include a rod or guide that extends through the piston and the check disk and that is coupled on a distal end to the valve body within the fluid chamber, such that the piston and check disk slide along the rode or guide, preventing or restraining lateral movement of the piston and check disk and preventing sticking. In another example, the reinforcement mechanism may include a push rod coupled to the piston, and a push rod chamber sized to receive the push rod. In this example, the push rod chamber may restrict lateral movement of the push rod, thereby restricting lateral movement of the piston and the check disk. By restricting lateral movement of the piston and the check disk, the reinforcing mechanism ensures a consistent travel path of the piston and the check disk and prevents sticking due to fluid pressure, debris, or both. Further, the reinforcement mechanism may eliminate sticking of the valve due to pressure, debris, or both, enhance overall production, reduce the frequency of maintenance, and provide other advantages.

In some embodiments, a valve unit may include at least one sensor to generate a signal indicative of a position of the check disk. The sensor may provide data related to the signal to a processor, which may be configured to determine fluid flow parameters (such as liquid volume, entrained gas volume, and other information) based on the data. In some implementations, the sensor may be positioned to measure the position of the check disk based on a position of a push rod coupled to the piston or check disk. In some implementations, the valve unit may include a sensor assembly configured to produce a dynamic signal corresponding to movement of the check disk and to produce a reference signal corresponding to a static tube. A fluid flow path may be provided from a chamber of the valve into a sensor housing and back to the chamber of the valve, exposing the sensor assembly to the fluid. By exposing the sensor assembly to the fluid, environmental noise, such as temperature, pressure, vibrations, and other environmental inconsistencies from the fluid mixture flowing through the valve, can be canceled out by subtracting the reference signal from the dynamic signal, thus reducing the impact of the environment on the accuracy of sensor measurements.

In some embodiments, a valve may include a check disk configured to engage a valve seat to close a fluid flow path from the fluid chamber to the outlet and disengage the valve seat to open the fluid flow path. The check disk may be coupled to or integrated with a piston that is configured to move within a piston chamber in response to movement of the check disk. The valve may include a reinforcement mechanism configured to restrain lateral movement of the piston and the check disk to guide (or partially restrain) movement of the check disk, preventing the check disk from becoming stuck due to debris and pressure. In an example, the piston or a push rod coupled to the piston may extend into an associated chamber, which may guide the piston to move linearly within the piston chamber and which prevents lateral movement of the piston and the check disk. Thus, the piston may support and reinforce the check disk to enable the check disk to open and close and to prevent the check disk from moving laterally. In other implementations, a push rod may be coupled to the piston and the push rod may extend within an associated chamber that may restrict lateral movement of the push rod, thereby restricting lateral movement of the piston and the check disk. Other implementations are also possible.

In some implementations, the portion of the push rod that is within the chamber restrains the lateral movement of the piston. The length of the push rod and the associated length of the chamber may be selected based on pressures expected to be experienced by the piston. In one implementation, a length to diameter ratio (i.e., the length of the restrained portion of the push rod or the restrained portion of the piston relative to the diameter of the bore (or valve size)) may be selected to be two or greater. For example, in one possible implementation, the length of the push rod may be three times the diameter of the bore, such that a 4-inch valve may have a twelve-inch push rod. By increasing the ratio of the length to the diameter, the piston rod or push rod (or the valve piston, if it is extended to provide the selected ratio) may restrain lateral movement of the check disk and prevent the check disk from sticking due to debris. Other implementations are also possible.

Additionally, the valve unit may include integrated sensors configured to monitor a plurality of parameters. In some embodiments, the integrated sensors may be configured to determine data related to the position of the check disk during operation and may determine such data over time. The position sensor information can be used to determine the volume of gas and liquid phase fluid components of the medium (fluid, gas, or any combination thereof) pumped through the valve based on the position measurements. In some embodiments, the integrated sensors may include a first position sensor to detect dynamic movement of the check disk and a second position sensor to provide static position measurement data and a fluid flow path across the first and second position sensors so that the fluid environment (temperature, pressure, other environmental inconsistencies within the fluid, or any combination thereof) influences both position sensors.

In some embodiments, a valve unit may include a valve including a check disk and a sensor assembly coupled to the valve and configured to determine movement of the check disk. The sensor assembly may include one or more position sensors and a circuit coupled to the sensors. In an embodiment, a first position sensor may generate a first electrical signal proportional to a position of the check disk, and a second position sensor may be configured to generate a second electrical signal representing a reference signal. The circuit may be configured to determine gas phase components and liquid phase components of a fluid flowing through the valve based on the first and second electrical signals.

In other embodiments, a device may include a sensor assembly coupled to a valve. The valve may include a check disk, which may be a piston check disk, a swing check disk, or a y-type valve check disk. The sensor assembly may include a first position sensor configured to generate a first electrical signal proportional to a position of the check disk. The sensor assembly may further include a second position sensor coupled to a static tube and configured to generate a second electrical signal representing a reference signal. Additionally, the sensor assembly may include a circuit coupled to the first and second position sensors and configured to determine gas phase components and liquid phase components of a fluid within the fluid conduit based on the first and second electrical signals. In some embodiments, the sensor assembly may be configured to determine a volume of liquid phase and a volume of gas phase components in response to the first and second electrical signals.

In some embodiments, a valve unit may include a sensor assembly coupled to a check disk. The valve unit may include a valve housing defining a fluid inlet, a fluid chamber coupled to the fluid inlet, and a fluid outlet that can be selectively coupled to the fluid chamber when the check disk is open relative to a valve seat. The valve unit may further include a piston liner extending partially into the valve housing, and a valve piston sized to fit within the piston liner. The valve piston may be coupled to the check disk and configured to move along a pre-determined path in conjunction with movement of the check disk between a closed state (where the check disk is engaged with the valve seat) and an open state (where the check disk is disengaged from the valve seat) to selectively isolate the fluid outlet from the fluid chamber. The valve piston may include an opening extending through the valve piston in parallel with the pre-determined path to permit fluid flow through the valve piston.

The sensor assembly may include a piston rod or push rod coupled to the check disk of the valve. The push rod may include a lumen extending a length of the push rod and defining a dynamic target tube configured to receive the fluid from an opening in the piston rod. The sensor assembly may include a first liner sized to receive the push rod and configured to maintain a horizontal position of the check disk along a distance (stroke) traveled by the check disk. The valve assembly may further include a second liner parallel to and spaced apart from the first liner and coupled to a static target tube. The first and second liners are coupled by a first fluid flow path at a proximal end furthest from the check disk and by a second fluid flow path at a distal end adjacent to the check disk. The sensor assembly may further include a third fluid path outside of the first liner and coupled to the check disk. The sensor assembly may include a first position sensor including a first sensor body (or sensor element) within an enclosure defined by the first liner. The first sensor body may be configured to extend into the target tube and to generate an electrical signal proportional to a position of the piston rod relative to the first sensor body. The sensor assembly may further include a second position sensor including a second sensor body extending within the second liner and into the static target tube and configured to generate a reference signal.

In some embodiments, a valve unit may include a valve including a check disk configured to open and close in response to fluid pressure from a fluid mixture including liquid, debris, and entrained gas. The valve unit may further include a sensor assembly coupled to the valve. The sensor assembly may include at least one position sensor configured to generate an electrical signal related to movement of the check disk and circuitry coupled to the position sensor (s). The circuitry may be configured to determine a volume of entrained gas within the fluid mixture based on relatively high frequency components of the electrical signal and to determine a volume of liquid within the fluid mixture based on relatively low frequency components of the electrical signal.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Figure 1:
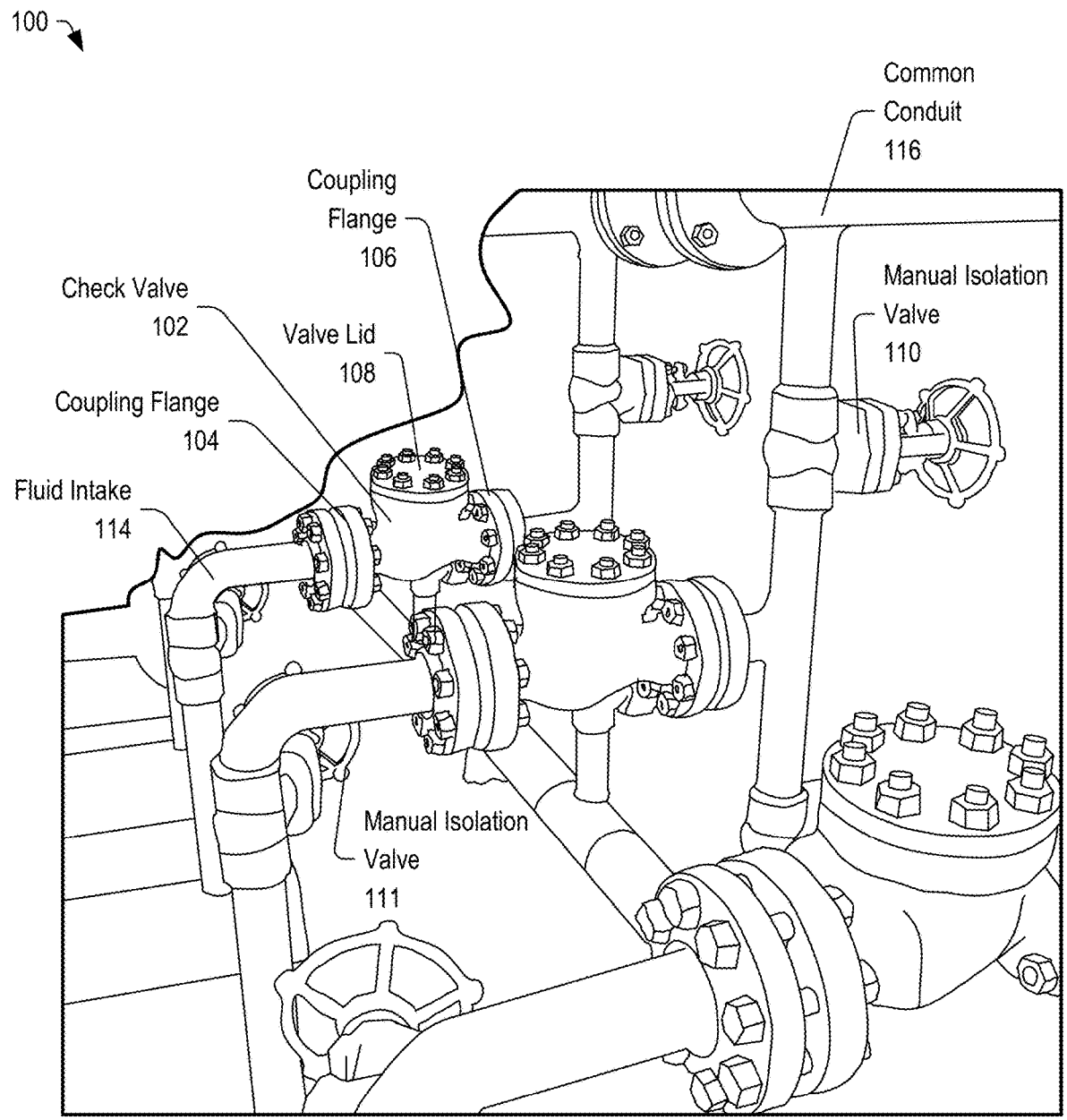
FIG. 1 depicts a system including a plurality of valves coupled between fluid sources and a common conduit.

Embodiments of a valve unit are described below that can include a valve including a check disk. The check disk may be part of a piston check valve, part of a swing check valve, part of a Y-pattern check valve, or part of another type of valve. In some embodiments, the check disk may be coupled to a reinforcement mechanism configured to restrain lateral movement of the check disk.

In conventional implementations, the piston stroke may be equal to or less than the diameter of the bore hole, for example, to reduce size and material costs of the valves. Unfortunately, such implementations are susceptible to sticking due to debris and pressure from fluid flowing through the valve. In some embodiments, a commercially available valve may be modified with a reinforcement mechanism to provide support for the check disk to restrain movement of the check disk to a pre-determined path. In other embodiments, a valve may include a piston that includes a portion that is greater than the diameter of the valve and that extends within or along a guide that restrains lateral movement of the check disk that is coupled to the piston. Other implementations are also possible.

Embodiments of the present disclosure may include a reinforcement mechanism for a conventional valve that may be used to extend or otherwise reinforce a valve piston so that the valve piston travels along a pre-determined path and so that lateral movement (deviations from the pre-determined path) is prevented. The reinforcement mechanism may operate to ensure movement of the check disk between an open state and a closed state along a consistent path, constraining movement of the valve piston and the check disk such that the check disk may move along the pre-determined path between an open position separated from a valve seat to a closed position in contact with the valve seat. The restricted movement allows the check disk to open and close a fluid path within the valve over extended periods without sticking due to debris within a fluid mixture, fluid pressure of the fluid mixture, or any combination thereof. In some embodiments, the reinforcement mechanism prevents the check disk from becoming stuck.

Additionally, embodiments of the valve unit may include an integrated sensor assembly coupled to a portion of the reinforcement mechanism, such as a push rod. The integrated sensor assembly may include one or more single-position-channel or dual-position-channel sensors, which may generate electrical signals proportional to the motion of a check disk. A single-position-channel sensor may generate an electrical signal indicative of or proportional to a position, such as the position of the check disk, the position of a push rod that moves in conjunction with the check disk, or the position of a static target tube. A dual-position-channel sensor has a single sensor body and is configured to generate a pair of electrical signals, independent of one another, i.e., two channels. For example, the dual-position-channel sensor may extend into a target tube that does not uncover the second channel, allowing the second channel to produce a static reference signal. The first channel of the dual-position-channel sensor may produce a time-varying signal indicative of or proportional to a position, such as the position of first channel relative to the position of the tube as the first channel is uncovered. In some implementations, the target tube may be formed in a push rod or piston that is coupled to the check disk and configured to move in response to movement of the check disk. The integrated sensor assembly may include circuitry, including a processor, which may be configured to determine flow rate of liquid and gas components of a fluid flowing through the valve based on the electrical signals.

In some embodiments, the check disk may be part of a piston check valve, part of a swing check valve, part of a Y-pattern check valve, or part of another type of valve, and the sensor assembly may be configured to measure movement of the check disk. In an example, the movement may be measured based on rotation or motion of the swing arm of the swing check valve about a pivot axis. In another example, the movement may be measured based on changing position information associated with the piston mounted check disk of a piston check valve or a Y-pattern check valve. Other embodiments are also possible.

In some embodiments, the integrated sensor assembly may include at least one single-position-channel sensor configured to generate an electrical signal proportional to a position of the check disk. In a particular embodiment, the sensor assembly may include a first single-position-channel sensor configured as a dynamic linear sensor to generate a first electrical signal proportional to a position of the check disk. The sensor assembly may also include a second single-position-channel sensor configured as a static sensor to generate a second electrical signal representing a static reference position. Both single-position-channel sensors may be exposed to a fluid mixture flowing past the check disk and through the valve via fluid paths. In a particular embodiment, a piston valve may include a check disk and a piston body. The piston body may include one or more fluid openings extending through the piston body and into an interior of a housing of the sensor assembly to allow some of the fluid to flow into a sensor housing and around the single-position-channel sensors.

It should be understood that the fluid mixture may be comprised of a plurality of components, including liquids, entrained gases, and solids. In one particular example, the fluid mixture may be a crude oil mixture including oil, water, entrained gas, contaminants (sand, fragments of casing material, other solids, or any combination thereof), chemicals, other components, or any combination thereof. Other fluid mixtures are also possible.

In some embodiments, systems, apparatuses, and methods are described below that can include a check disk valve including a reinforcement mechanism that can operate to restrain movement of the check disk along a pre-determined path. In some implementations, the check disk valve may also include a sensor assembly coupled to a check valve. The check valve may include a check disk configured to move back and forth in response to fluid pressure to open and close a fluid path from a fluid inlet to a fluid outlet. One or more single-position-channel or dual-position-channel sensors may be configured to determine movement of the check disk. The sensor assembly may be configured to determine one or more parameters associated with a fluid mixture flowing through the valve based on signals from the sensors making up the sensor assembly.

In some embodiments, the sensor assembly may include a housing including a first liner sized to receive a push rod, which may be coupled to a check disk of the valve. The push rod and the first liner (or cylinder) may represent a reinforcement mechanism. The push rod may include a proximal end and a distal end. The distal end may be coupled to the check disk (or to a valve piston coupled to the check disk) and may be configured to move back and forth within the first liner of the sensor housing in response to movement of the check disk. The push rod may be configured to restrain lateral movement of the check disk along a pre-determined path such that fluid pressures and debris within the fluid mixture do not cause the check disk to become stuck within the valve housing.

In some embodiments, the sensor assembly may include at least one position sensor and may further include a circuit coupled to the sensor assembly. The circuit may be configured to receive a first electrical signal related to a dynamic position of the check disk and to receive a second electrical signal corresponding to a static reference position. The circuit may be configured to determine a position of the check disk over time based on the first and second electrical signals and to determine flow information corresponding to components (gas and liquid) of the fluid mixture flowing through the valve based on the frequency data contained within the first and second electrical signals. Other embodiments are also possible.

In the following discussion, the term "fluid" is used to refer to a fluid mixture, such as a crude mixture. In one embodiment, the fluid may include liquid phase components (such as water), gas phase components (such as entrained air, natural gas, and so on), chemicals, solids (such as sand, solid particles, and so on), or any combination thereof. In the context of a crude mixture, the fluid mixture may include oil, water, entrained gas, contaminants (sand, pieces of casing, metal shavings, and other solid debris), chemicals, other components, or any combination thereof. While the following discussion largely focuses on oil industry applications, it should be appreciated that the valve unit may be implemented in other contexts, including process control environments, food industry environments, beverage industry environments, and so on. In particular, the valve unit may be used in any environment for flow measurements of a chaotic fluid mixture.

To provide a context in which the sensor assembly may be utilized, multiple check valves may be used in an oil production environment at the well head, ahead of a common conduit, and at a variety of other locations. The sensor assembly may be utilized in any of these environments, to monitor the working order of the check valve, to monitor flow volume and type of flow passing through the check valve, as well as at various locations along a pipeline to determine consistency of flow (as would become non-consistent due to a pipeline breach), as will become apparent from the discussion below.

FIG. 1 depicts a system 100 including a plurality of check valves 102 coupled between fluid sources (e.g., fluid intakes 114 receiving the fluid mixture from a wellhead or other source) and a common conduit 116. Each check valve 102 may include a coupling flange 104 coupled to a corresponding flange of the fluid intake 114 and including a coupling flange 106 coupled to a corresponding flange of a pipe coupled to the common conduit 116. Further, each check valve 102 may include a valve lid or cover 108, which may be bolted or otherwise secured to the housing of the check valve 102.

In some embodiments, each of the pipes between the check valve 102 and the common conduit 116 may include a manual isolation valve 110, which can be accessed by an operator to isolate a check valve 102 from the common conduit 116. Further, each of the fluid intakes 114 may be coupled to a fluid source to receive a fluid mixture, such as crude oil pumped out of an oil well, and may include a manual isolation valve 110 that can be accessed by an operator to isolate the check valve 102 from the fluid source.

The check valves 102 of the system 100 of FIG. 1 may provide a one-way fluid path for the fluid mixture to pass from the fluid intake 114 to the common conduit 116. However, the check valves 102 may become stuck or may otherwise fail. In some embodiments, the check valves 102 may include a check disk configured to move within a fluid chamber within the housing of the check valve 102 to allow fluid to flow through the check valve 102 from the intake 114 to the common manifold 116 and to prevent flow in the opposite direction. In one example, the check valves 102 may become stuck due to debris from the fluid mixture lodged between the check disk and the housing. In another example, the check disk may become stuck (or worn over time) due to fluid pressure from the fluid mixture pushing the check disk against the housing within the check valve 102.

In the following discussion, a valve unit is disclosed that may include a check valve including a check disk configured to open and close to allow and prevent flow of a fluid mixture through the valve. The valve unit may further include a reinforcement mechanism coupled to the check disk that may be configured to guide and restrain movement of the check disk to prevent sticking due to debris, fluid pressure, or both. Further, in some embodiments, the valve unit may further include a sensor assembly coupled to the valve and configured to monitor flow of a chaotic fluid mixture through the valve based on movement of the check disk. In some embodiments, the sensor assembly may include at least one position sensor configured to generate electrical signals that are proportional to movement of the check disk. In a particular embodiment, as described below, a device may include a check valve and a sensor assembly.

In some embodiments, the sensor assembly may include a pair of single-position-channel sensors including a first sensor configured to measure movement of the check disk and a second sensor configured to provide a reference signal, where both sensors may be exposed to the fluid mixture such that temperature and pressure are consistent across both sensors. In other embodiments, the sensor assembly may include a dual-position-channel sensor configured to provide a first electrical signal proportional to movement of the check disk and a second electrical signal that represents a static reference signal. One possible example of a device including a reinforcement mechanism is described below with respect to FIG. 2.

Figure 2:
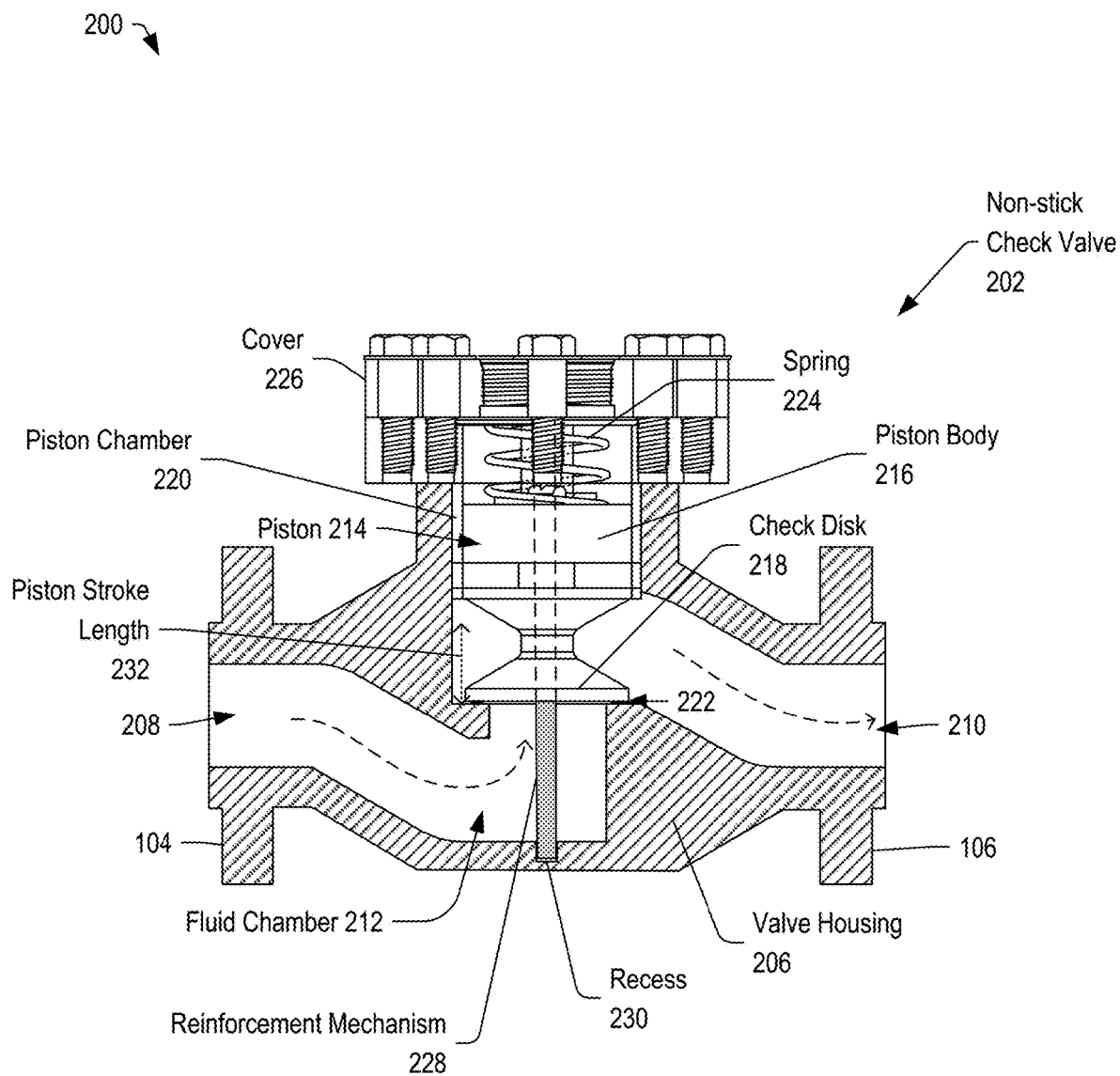
FIG. 2 depicts a diagram of a valve unit, in partial cross-section, including a reinforcement mechanism extending through a piston and an associated check valve to restrain lateral movement of the check disk, in accordance with certain embodiments of the present disclosure.

FIG. 2 depicts a diagram of a valve unit 200, in partial cross-section, including a reinforcement mechanism 232 extending through a piston 214 and an associated check disk 218 to restrain lateral movement of the check disk 218, in accordance with certain embodiments of the present disclosure. The valve unit 200 may include a valve housing 206 including a fluid inlet 208 and a fluid outlet 210 and including a fluid chamber 212 between the inlet 208 and the outlet 210.

The valve unit 200 may further include a piston 214 including a piston body 216 coupled to a check disk 218. The piston body 216 may move within a piston chamber 220 as the check disk 218 moves away from and toward a valve seat 222. The valve unit 200 may also include a spring 224 configured to bias the valve piston 214 and the check disk 218 toward the valve seat 222. Additionally, the valve unit 200 may also include a cover 226. Further, the valve unit 200 may include a reinforcement mechanism 228 that extends through the piston body 216 and the check disk 118 and through the fluid chamber 212 into a recess 230 within the valve housing 206.

In operation, the piston 214 may move along a pre-determined path as generally indicated by the dashed arrow 232. The reinforcement mechanism 228 may be a rod formed from stainless steel or from another rigid material. The piston 214 may move up and down along the reinforcement mechanism 228, which may restrain the piston 214 from moving laterally, preventing the check disk 218 from sticking due to fluid pressure, debris, or any combination thereof. In some implementations, a groove or notch may be formed on the reinforcement mechanism 228 that may engage a corresponding feature on an interior surface of the piston 214 to prevent the piston from rotating about the reinforcement mechanism 228. Other implementations are also possible.

It should be appreciated that the piston chamber 220 may be larger in diameter than the piston body 216, which may ordinarily allow the piston 214 to experience some small amount of lateral movement due to fluid pressure. Such lateral movement can cause debris to become trapped within the fluid chamber 212, the piston chamber 220, or both, causing the check disk 218 to become stuck. By inserting the reinforcement mechanism 228 through the piston body 216 and the check disk 218, the reinforcement mechanism 228 controls the movement of the piston 214 and the check disk 218 to prevent lateral movement, preventing the check disk 218 from sticking due to debris and fluid pressure. In this example, the reinforcement mechanism 228 operates as a guide along which the piston 214 and the check disk 218 move. Other implementations are also possible.

Figure 3:
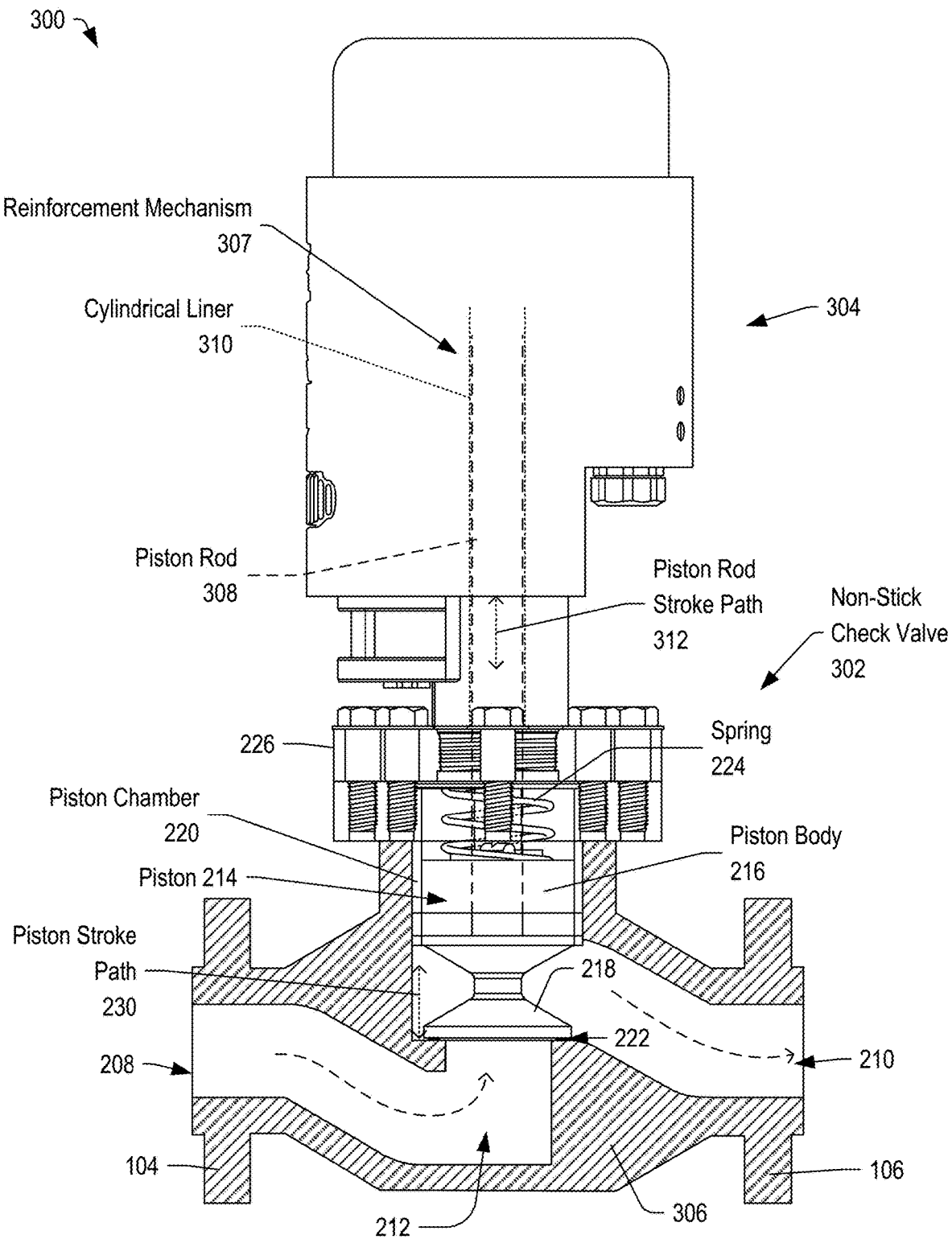
FIG. 3 depicts a diagram of a valve unit, in partial cross-section, including a reinforcement mechanism including a push rod coupled to a piston and extending into a cylindrical liner to restrain lateral movement of the check disk, in accordance with certain embodiments of the present disclosure.

FIG. 3 depicts a diagram of a valve unit 300, in partial cross-section, including a reinforcement mechanism 307 including a push rod or piston rod 308 coupled to a piston 214 and extending into a cylindrical liner 310 to restrain lateral movement of the check disk 218, in accordance with certain embodiments of the present disclosure. In this example, the valve body 306 does not include a recess to receive the reinforcement mechanism 307. Instead, the cover 226 may include an opening through which the piston rod 306 extends. Further, an additional housing 304 may be mounted to the cover 226. The housing 304 may include the cylindrical liner 310, which may be sized to receive the piston rod 308. The cylindrical liner 310 may be sized to receive the piston rod 308, to allow sliding movement of the piston rod 308 along a longitudinal axis of the cylindrical liner 310, and to prevent lateral movement, thereby restraining lateral movement of the piston 214 and the check disk 218.

In this example, the piston rod 308 may be attached to the piston 214 and may be configured to move with the movement of the piston 214, as indicated by arrow 312 (i.e., piston rod stroke path 312). The cylindrical liner 310 and the piston rod 308 may be formed from materials that have relatively low coefficients of friction, enabling the piston rod 308 to move along the pre-determined path defined by the longitudinal axis of the cylindrical liner 310. The piston rod 308 and the cylindrical liner 310 form a reinforcement mechanism 307 that may restrict lateral movement of the piston 214 and the check disk 218, preventing the check disk 218 from sticking. Other implementations are also possible.

It should be appreciated that the reinforcement mechanism 228 of FIG. 2 and the reinforcement mechanism 307 of FIG. 3 provide an advantage over conventional check valves because they prevent the check disk from becoming stuck due to fluid pressure, debris, or both. The reinforcement mechanism 307 of FIG. 3 may provide a further advantage because it can be used to determine measurements of the position of the check disk 218. Such measurements may be related to the flow rate of fluid components and gas components through the valve. Accordingly, in some implementations, it may be desirable to include a sensor assembly configured to measure movement of the check valve, either directly or through the reinforcement mechanism 307. One possible example of a valve unit including a reinforcement mechanism, such as the reinforcement mechanism 307, adapted for use in conjunction with a sensor assembly to monitor movement of the check disk 218 is described below with respect to FIG. 4.

Figure 4:
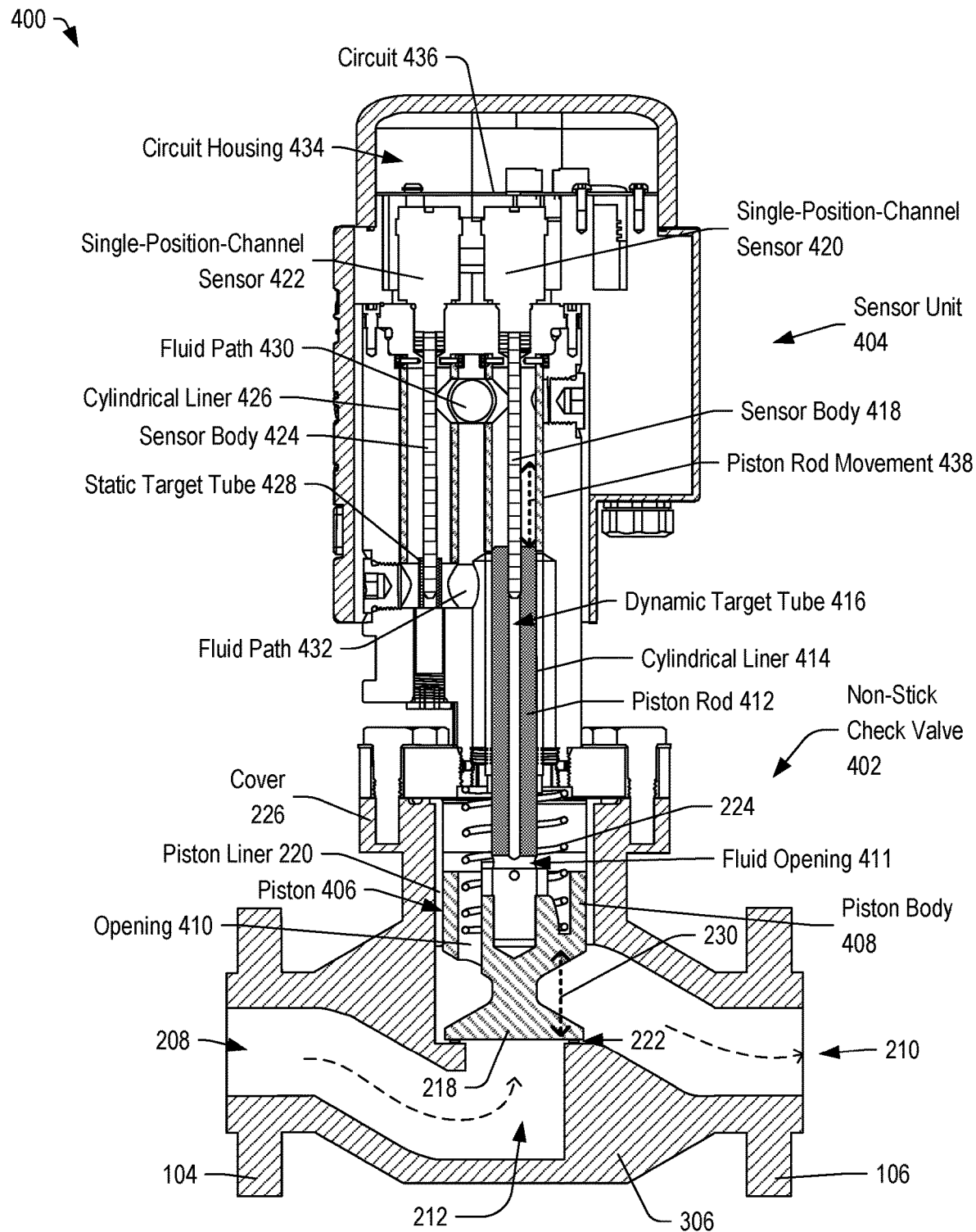
FIG. 4 depicts a cross-sectional view of a valve unit including a valve piston in a closed position, in accordance with certain embodiments of the present disclosure.

FIG. 4 depicts a valve unit 400 including a non-stick check valve 402 and a sensor unit 404 configured to provide an integrated flow sensor, in accordance with certain embodiments of the present disclosure. The valve 402 may be coupled to the sensor assembly 404, which may be configured to determine flow data associated with a fluid mixture flowing through the valve 402. In some embodiments, the sensor assembly 404 may determine parameters associated with fluid components of the fluid mixture and parameters associated with entrained gas components of the fluid mixture.

The valve 402 may include a valve housing 206 including a fluid inlet 208 extending through the coupling flange 104 and extending to a fluid chamber 212 within the valve housing 206. The fluid inlet 208 may be configured to receive a fluid mixture, such as crude mixture produced by an oil well. The valve 202 may further include a fluid outlet 210, which may extend from the fluid chamber 212 through the coupling flange 106 and to a pipe extending to the common conduit 116 or to another conduit.

The valve 402 may be an embodiment of a check valve that allows fluid (gas, liquid, other components, or any combination thereof) to flow in one direction. The valve 402 may include a valve piston 406, including a piston body 408 and a check disk 218. The valve piston 406 may be an embodiment of the valve piston 214 of FIGS. 2 and 3, except that one or more openings 410 may be formed through the piston body 408, allowing the fluid mixture to flow through the opening 228 and into the sensor assembly 204. The check disk 218 (or valve disk) may be configured to move between a closed position (where the check disk 218 is engaged with a valve seat 222) and an open position (where at least a portion of the check disk 218 is disengaged from the valve seat 222). The valve 202 may further include a spring 224 between the valve piston 406 and a cover 226 of the valve housing 206 to bias the check disk 218 toward the valve seat 222 and into a closed position.

The sensor unit 404 may include a housing, which may define an enclosure sized to enclose one or more single-position-channel sensors and to house and secure circuitry that can be sealed from the surrounding environment and from the fluid mixture flowing through the valve 402. In some embodiments, the sensor unit 404 may include a single-position-channel sensor configured as a dynamic position sensor that can generate electrical signals that vary proportionally based on movement of the check disk 218. The sensor unit 404 may further include a second single-position-channel sensor configured to generate a second electrical signal representing a static reference signal.

In operation, pressure from the fluid mixture received at the fluid inlet 208 may push the check disk 218 into an open position, compressing the spring 224 by causing the piston body 408 to apply a compression force to the spring 224. When a pump or other fluid source pushes the fluid mixture toward the valve 402, the fluid mixture flows through the inlet 208 and pushes the check disk 218 open, allowing the fluid to flow out of the valve 202 through the outlet 210. Movement of the check valve 218 may move the piston body 408, which may be coupled to a push rod or piston rod 412 that extends into the sensor unit 404.

The push rod or piston rod 412 may extend into a cylindrical liner 414. The push rod or piston rod 412 may move within the cylindrical liner 414 in a direction that is parallel to the longitudinal axis of the cylindrical liner 414. The interior surface of the cylindrical liner 414 may define a pre-determined path along which the push rod or piston rod 412 travels. The cylindrical liner 414 may prevent lateral movement of the push rod or piston rod 412, thereby preventing lateral movement of the piston 406.

The push rod or piston rod 412 may include a dynamic target tube 416, which may couple to the fluid opening 410 of the piston body 408 via an opening 411. The push rod or piston rod 412 may extend into and attach to the piston body 408. The fluid opening 411 may extend into the push rod or piston rod 412 adjacent to the piston body 408. Fluid from the fluid chamber 212 may flow through the openings 410 in the piston body 408, through the fluid opening 411 and into the dynamic target tube 416. The dynamic target tube 416 may be sized to receive a sensor body 418 of a first single-position-channel sensor 420.

The sensor unit 404 may further include a second single-position-channel sensor 422 including a sensor body 424 that extends through a cylindrical liner 426 and into a static target tube 428. It should be appreciated that the cylindrical liner 414 and the cylindrical liner 426 can have approximately the same dimensions. In some embodiments, the cylindrical liner 414 and the cylindrical liner 426 may be positioned side-by-side and aligned. Further, the sensor unit 404 may include a circuit housing 434 configured to seal circuitry 436 from the surrounding environment and from the fluid flowing through the valve 402 and within fluid flow paths within the sensor unit 404. The circuitry 436 may include a processor or microcontroller unit (MCU), one or more sensors (such as temperature sensors, pressure sensors, vibration sensors, moisture sensors, oil-to-water cut sensors, other sensors, or any combination thereof), analog-to-digital converters (ADCs), a transceiver including at least one input/output interface configured to communicate data from the circuitry 436 to a control system, other circuit components, or any combination thereof. It should be appreciated that the position sensors 420 and 422 may be configured to provide the electrical signals to the circuitry 436.

The first single-position-channel sensor 420 may generate an electrical signal proportional to the position of the push rod or piston rod 412 relative to the sensor body 418. Frequency components of the electrical signal may represent different constituent components of the fluid mixture. The second single-position-channel sensor 422 may provide a reference signal that can be used to cancel signals determined to be noise in the electrical signal of the first single-position-channel sensor 420. The fluid mixture may also circulate through the opening 410 and into the sensor unit 404, around the sensor body 418, through fluid path 430, around the sensor body 424, through a fluid path 432, and around the outside of the cylindrical liner 414 back into the fluid chamber 212, ensuring that temperature, pressure, and other environmental parameters of the fluid mixture are applied relatively equally to both position sensors 420 and 422.

When the pressure subsides, the spring 224 may bias the check disk 218 toward the fluid chamber 212, causing the check disk 218 to move into a closed position against the valve seat 222. Movement of the check disk 218 may move the push rod or piston rod 438 relative to sensor body 418 of the first single-position-channel sensor 420 within the sensor unit 404, causing the first electrical signal produced by the first single-position-channel sensor 420 to change as the push rod or piston rod 412 moves with the movement of the check disk 218. In some embodiments, seals around the piston body 408 (which may be included in conventional devices) may be omitted to allow for free or freer movement of the piston body 408 within the piston liner 220.

In the illustrated example, the fluid mixture from the fluid chamber 212 within the valve 402 may be received through the fluid inlet 208. As pressure in the fluid chamber 212 increases, the fluid pressure pushes the valve piston 406 open (as indicated by the arrow 230), allowing the fluid mixture to flow to the outlet 210. A portion of the fluid mixture from the fluid chamber 212 may flow through the opening 410 and via opening 411 into the dynamic target tube 416 of the piston or push rod 412. The movement of the piston valve 406 as indicated by arrow 230 causes a corresponding movement of the piston or push rod 402 as indicated by the arrow 438. The fluid mixture may flow into the cylindrical liner 414, through the first fluid path 430 to the cylindrical liner 426 and through the second fluid path 432 to a third fluid path, which may be defined by channels in the cylindrical liner 414 or the piston or push rod 412 or which may include a fluid path between the liner 414 and the housing to allow the fluid mixture to flow back to the piston body 408. The fluid mixture flowing through cylindrical liners 414 and 426, through the first and second fluid paths 430 and 432, and through the dynamic target tube 416 can operate to equalize temperature and pressure about the sensor bodies 418 and 424.

In some embodiments, the circuitry 436 may be electrically coupled to the first single-position-channel sensor 420 and the second single-position-channel sensor 422, the sensor bodies 418 and 424 of which may be exposed to the fluid mixture. The circuitry 436 within the sensor unit 404 may include one or more analog-to-digital converters to convert the analog electrical signals from the single-position-channel sensors 420 and 422 into digital samples. Alternatively, the single-position-channel sensors 420 and 422 may provide digital output signals. The circuitry 436 may also include a processor or microcontroller unit (MCU) configured to receive the digital samples. The circuitry 436 may also include other sensors, including temperature sensors, pressure sensors, moisture sensors, vibration sensors, oil-to-water cut sensors, other sensors, or any combination thereof. In some embodiments, the processor or microcontroller unit (MCU) of the circuitry 436 of the sensor unit 404 may be configured to receive electrical signals from the position sensors and the other sensors and may process the received signals to determine a volume in the fluid chamber 212 of the valve 402 over time at least in part based on the movement of the check disk 218 over time. The processor may also determine a variety of other parameters, independently of or in conjunction with sensor signals of the single-position-channel sensors 420 and 422, based on the received signals, including pressure, temperature, gas volume, liquid volume, check disk position, oil-to-water cut ratio, other parameters, or any combination thereof. In a particular example, the processor may detect wear, failure, or other parameters associated with the check disk 218, including a stuck valve condition, based on the received signals. In an example, when the fluid mixture is flowing through the valve 202, the electrical signal remaining constant for more than a threshold period of time may be indicative of a stuck valve. Other characteristics of the electrical signal may be detected that may indicate the state of the valve 402, the check disk 218, or both.

Further, unlike conventional valves, the piston body 408 of the valve piston 406 may include the opening 410 configured to couple the fluid chamber 212 to a fluid flow path within the sensor unit 404. By allowing the fluid mixture to flow into the sensor unit 404, the fluid mixture may contact both the sensor body 418 within the dynamic target tube 416 and the sensor body 424 within the static target tube 428 of the sensor unit 404 to provide a substantially uniform environment (temperature, pressure, other environmental parameters, or any combination thereof) across both single-position-channel sensors 420 and 422.

It should be appreciated that the fluid mixture may include liquid components, particles or solid contaminants, and entrained gases. The different components of the fluid mixture may cause the check valve 218 to move differently, for example, at different frequencies, different amplitudes, or both. In an example, entrained gas present in the fluid mixture may expand rapidly in the fluid chamber 212 and into the fluid path within the sensor unit 404. The expansion of the entrained gas within the fluid chamber 212 may cause the check disk 218 to move in a first direction to open the valve 402 relatively rapidly, and, as the gas pressure dissipates, the spring 224 may cause the check disk 218 to move in a second direction toward the chamber 212 and against the valve seat 222, moving back and forth along a pre-determined path, rapidly. Liquid components in the fluid mixture may cause the check disk 218 to move in the first direction and the spring 224 may cause the check disk 218 to move in the second direction, moving back and forth along the pre-determined path, but less rapidly than with expansion of the entrained gas.

The first single-position-channel sensor 420 of the sensor unit 404 can be used to measure movement of the check disk 218 based on the position of the piston rod 412. In particular, the position of the piston or push rod 412 relative to the sensor body 418 induces an electrical signal in the sensor body 418 that can be provided to a processor or an MCU of the circuitry 436 through an ADC. From the measurements, the processor or MCU of the circuitry within the sensor unit 404 may be configured to determine the state and position of the check disk 218 and to determine liquid flow volume, gas flow volume, or any combination thereof. The second single-position-channel sensor 422 may produce a reference signal based on a static position of the static target tube 428. In particular, the stable position of the position sensor body 424 relative to the static target tube 428 (which has a fixed position) produces a reference signal that can be provided to the processor or MCU through an ADC of the circuitry 436. The reference signal may be used by the processor or MCU to remove noise from the measurement signals provided by the first single-position-channel sensor 420. In some implementations, the processor or MCU can utilize the reference signal from the position sensor 422 to cancel noise due to vibration, temperature, pressure, or other environment factors from the signal received from the position sensor 420, producing a relatively accurate position signal.

In an alternative embodiment, the circuitry within the sensor unit 404 may communicate data (i.e., raw sensor data) to a processor or MCU that is external to the sensor unit 404, which external processor or MCU may be configured to determine fluid flow rates and contents of the fluid mixture.

It should be appreciated that the cylindrical liner 414 and the piston rod 412 cooperate to provide lateral support so that the check disk 218 and the associated piston body 408 move back and forth along a pre-determined path. The pre-determined path may be defined by an interior surface of the cylindrical liner 414, such that the piston body 408 and the check disk 218 move back and forth a long a path that corresponds to a longitudinal center of the cylindrical liner 414. In some embodiments, the cylindrical liner 414 provides lateral (circumferential) support to maintain the direction of movement of the piston body 408 and the check disk 218 toward and away from the valve seat 222 by securing the piston rod 412.

In the illustrated example, it should be appreciated that the piston body 408 may have a diameter that is less than interior diameter of the piston liner 220, allowing the piston body 408 to move laterally (a small amount) within the piston liner 220 in response to fluid pressure. The piston or push rod 412 extends within the cylindrical liner 414 and moves with the movement of the check disk 218. The length of the piston or push rod 412 may be selected so it does not impede fluid flow through the first path 430 when the valve piston 406 is in a compressed position, disengaging the check disk 218 from the valve seat 222 and allowing the fluid mixture to flow to the outlet 210.

The piston or push rod 412 may provide lateral support for the valve piston 406 to limit lateral movement of the valve piston 406 (and the piston body 408) in response to fluid pressure. The piston or push rod 412 may be selected to have a diameter sufficient to withstand peak shearing forces and may have a length sufficient to remain at least partially within the cylindrical liner 414 for the entire length of the stroke of the valve piston 406 and associated check disk 218. The lateral support provided by the piston or push rod 412 may ensure that the pre-determined path of the check disk 218 and the valve piston 406 remains consistent, even when the valve piston 406 is exposed to fluid pressure. The length and diameter of the piston or push rod 412 may be adjusted or sized proportionally to maintain a substantially straight path of the valve piston 406 even when exposed to expected peak shear forces from the fluid mixture (from the inlet 208). In an example, the piston or push rod 412 may be selected to have a length that is two or more times the diameter of the valve. In one possible example, the piston or push rod 412 may be three times the diameter of the valve. In this example, a four-inch valve may have a piston or push rod 412 that is approximately twelve inches long. Other sizes and other implementations are also possible.

It should be appreciated that the embodiments depicted in FIGS. 2 through 4 represent two-inch valves. However, other valve sizes may also be accommodated by using a check disk 218 with a larger diameter and by adjusting the length of the piston or push rod 412. Depending on the peak fluid pressure, the diameter of the piston or push rod 412 may also be increased. It should be appreciated that the size of the cylindrical liner 414 and the length of the piston or push rod 412 may be adjusted in tandem, such that when the check disk 218 is fully open (i.e., pushed by fluid pressure to a fully open position), the end of the piston or push rod 412 does not block fluid flow through the fluid path 430 within the sensor unit 404. Other embodiments are also possible.

In the example of FIG. 4, the piston body 408 includes an opening 410, which may extend through the piston body 408 from a location adjacent to the check disk 218 to an area within the sensor unit 404. Once possible example of a valve piston 406 including the opening 410 is described below with respect to FIGS. 5A and 5B.

Figure 5A:
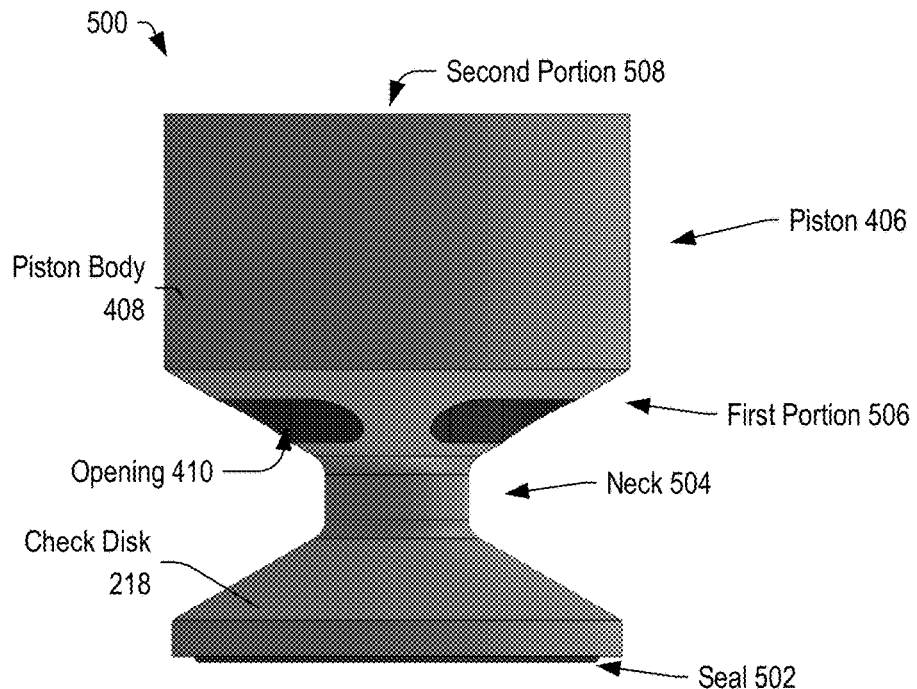
FIG. 5A depicts a side view of the valve piston of FIG. 4 including a piston body and a check disk, in accordance with certain embodiments of the present disclosure.

FIG. 5A depicts a side view 500 of a valve piston 406 including a piston body 408 and a check disk 218, in accordance with certain embodiments of the present disclosure. The valve piston 406 may include a seal 502 coupled to a bottom portion of the check disk 218. Further, the valve piston 406 may include a neck portion 504 that connects the check disk 218 to the piston body 408. Additionally, the piston body 408 includes at least one opening 410 that extends from a bottom portion 506 of the piston body 408 to a top portion 508 of the piston body 408.

In some embodiments, the opening 410 allows the fluid mixture to flow from the fluid chamber 212 into a fluid flow path within the sensor unit 404 (in FIG. 4). In some embodiments, the fluid mixture may flow around one or more position sensors, exposing both position sensors to the fluid mixture in the same way.

Figure 5B:
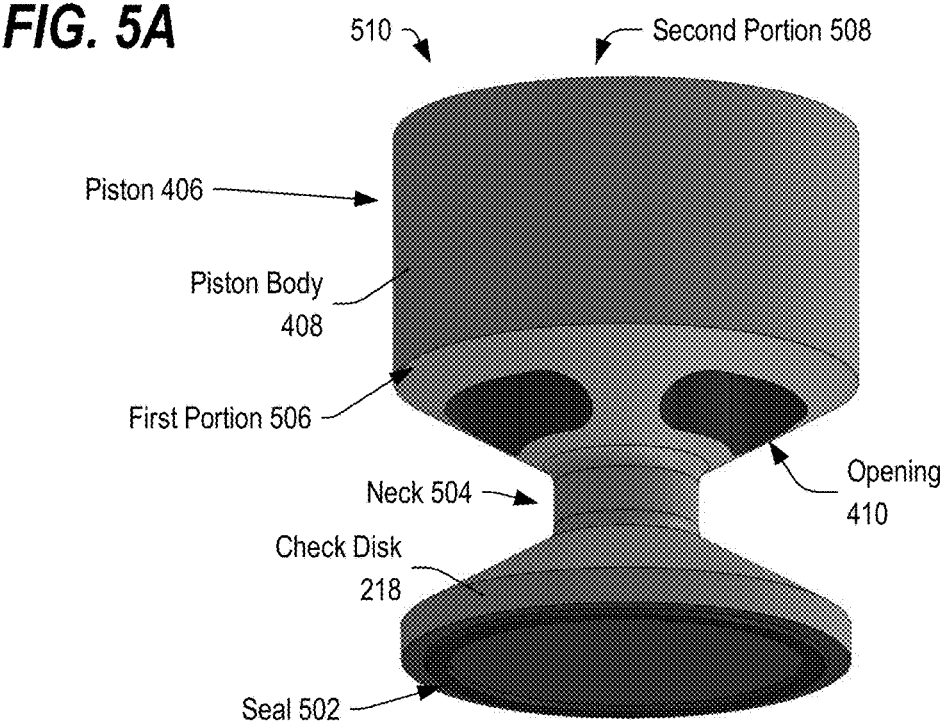
FIG. 5B depicts a perspective view of the valve piston of FIG. 5A depicting fluid openings through the piston body, in accordance with certain embodiments of the present disclosure.

FIG. 5B depicts a perspective view 510 of the valve piston 406 of FIG. 5A depicting fluid openings 410 through the piston body 408, in accordance with certain embodiments of the present disclosure. Further, the seal 502 is shown to be implemented as a ring formed on a bottom portion of the check disk 218. The seal 502 may be configured to engage the valve seat 222 of the valve 402 (of FIG. 4).

It should be understood that a push rod or other element may be coupled to the upper surface 508 of the piston body 408, such that movement of the check disk 218 due to pressure from the fluid mixture moves the push rod 412 within a cylinder liner 414. The motion of the push rod 412 can be detected by at least one position sensor, and circuitry within the sensor assembly may be configured to determine fluid flow parameters, gas flow parameters, other parameters, or any combination thereof.

Figure 6:
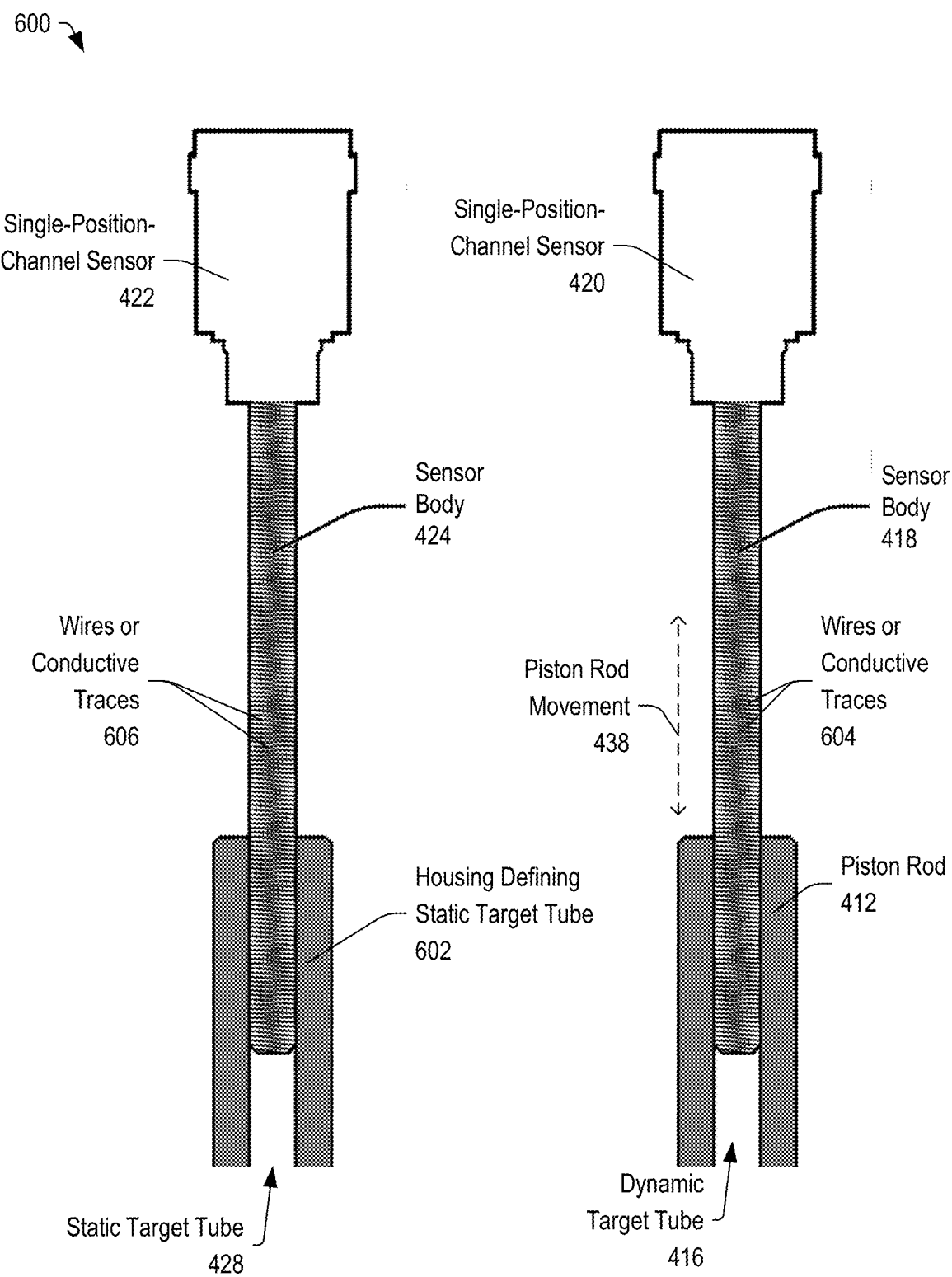
FIG. 6 depicts a pair of single-position-channel sensors configured as a dynamic position sensor and a static position sensor, in accordance with certain embodiments of the present disclosure.

Turning to FIG. 6, the single-position-channel sensors 420 and 422 are shown. The single-position-channel sensor 420 includes the sensor body 418, which extends into the dynamic target tube 416 of the piston or push rod 412. The single-position-channel sensor 422 includes a sensor body 424, which may be the same as the sensor body 418. However, the sensor body 424 extends into a static target tube 428, which may be defined by the housing 602, such as a recess in the housing of the sensor unit 404, for example.

The sensor body 418 may include a plurality of conductive wires or traces 604 that are wound around a core and that are configured to generate an electrical field. The piston or push rod 412 interrupts the electrical field at a location along the sensor body 418 where the piston or push rod 412 surrounds the sensor body 418. As the piston or push rod 412 moves (in response to movement of the check disk 218), the location at which the electrical field about the sensor body 418 is broken changes, producing an electrical signal proportional to the position of the piston or push rod 412. The changing electrical signal represents the motion of the piston or push rod 412 and, by virtue of their mechanical coupling, the movement of the check disk 218 as well. Other embodiments of position sensor types could also be used. Similarly, the sensor body 424 may include a plurality of wires or wire traces 606 that are wound around a core and that are configured to generate an electrical field. The housing 602 or another element that defines the static target tube 428 interrupts the electrical field at a location along the sensor body 424. However, since the housing 602 does not move relative to the sensor body 424, the position at which the electrical field of the sensor body 424 is interrupted does not change, allowing the single-position-channel sensor 422 to provide a reference signal that can be used to cancel noise from the dynamic signal of the single-position-channel sensor 420.

In the embodiments described above with respect to FIGS. 3 and 4, the fluid mixture may flow from the valve 402 and around the sensor bodies 418 and 424, exposing both single-position-channel sensors 420 and 422 to the same pressures, temperatures, other environmental changes, or any combination thereof. Circuitry 436 coupled to the single-position-channel sensors 420 and 422 may utilize the reference signal to cancel noise from the dynamic signal produced simultaneously across both single-position-channel sensors 420 and 422. Since the dynamic position sensor (i.e., sensor 420) experiences noise plus motion and the static position sensor (i.e., sensor 422) experiences only noise (with no motion), subtraction of the static noise signal from the dynamic noise signal leaves a remaining signal that represents the dynamic motion of the check disk 218. Other embodiments are also possible.

Figure 7:
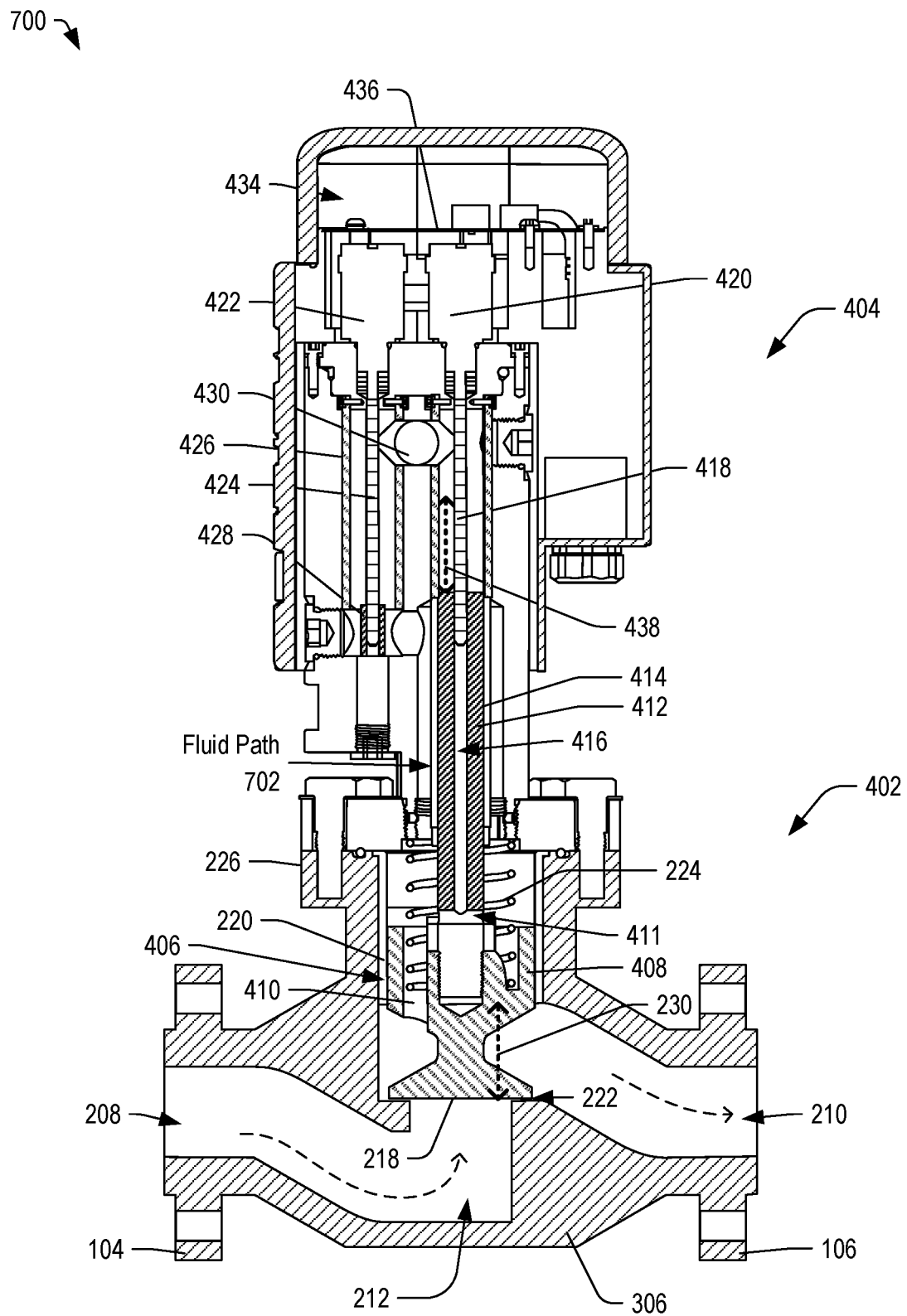
FIG. 7 depicts a cross-sectional view of the valve unit of FIG. 4 including arrows indicating directions of movement of a valve piston and an associated piston rod in a closed state, in accordance with certain embodiments of the present disclosure.
Figure 8:
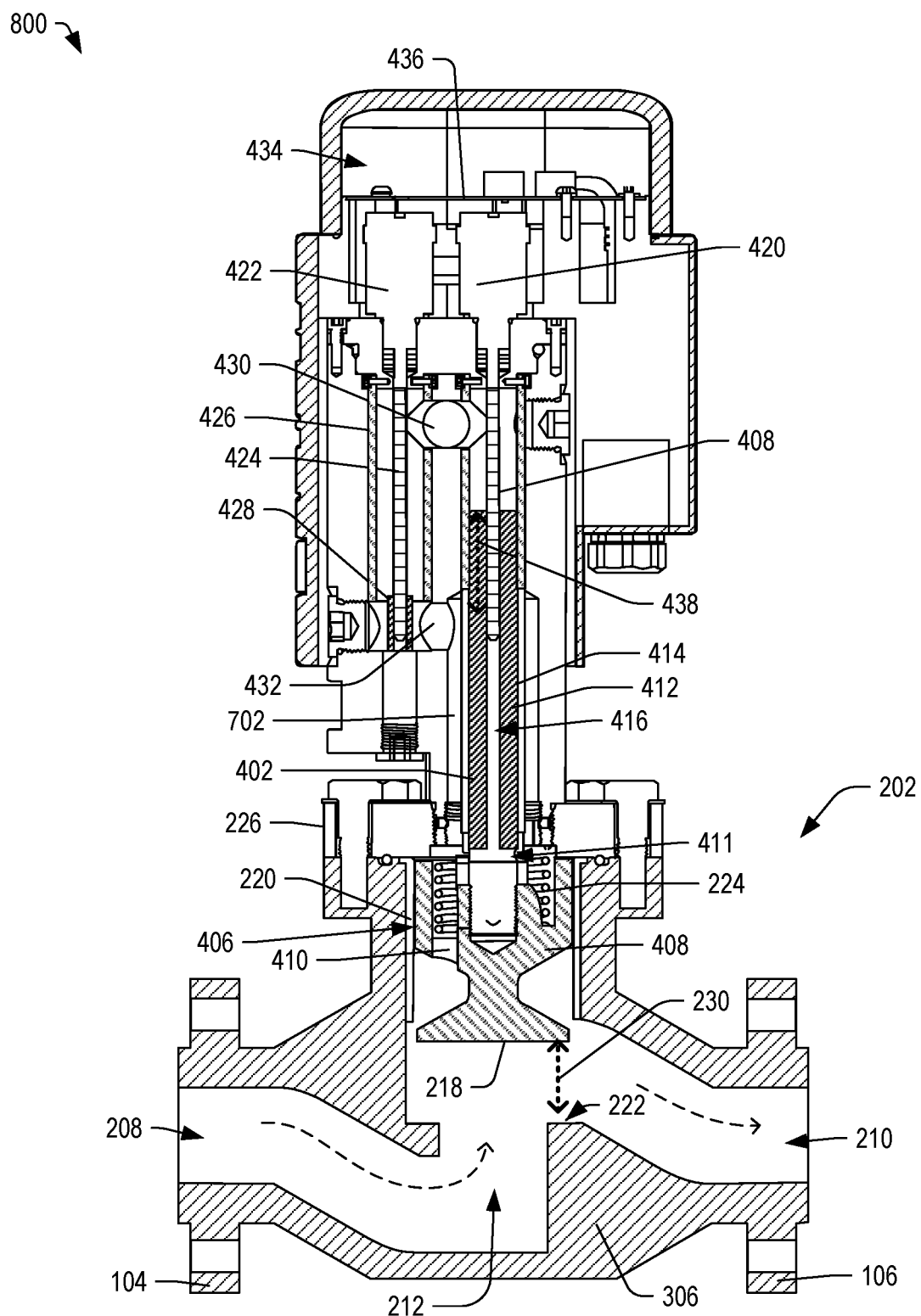
FIG. 8 depicts the cross-sectional view of the valve unit of FIG. 4 including the arrows indicating directions of movement of the valve piston and the associated piston rod in an open state, in accordance with certain embodiments of the present disclosure.

FIGS. 7 and 8 depict views 700 and 800, respectively, of the valve unit 400 of FIG. 4. The view 700 depicts the valve unit 400 with the check disk 218 in a closed position. The cross-sectional view 800 depicts the valve unit 400 with the check disk 218 in an open position.

In FIG. 7, the check disk 218 is in contact with the valve seat 222, closing the valve to prevent fluid flow from the fluid outlet 210 back into the fluid chamber 212. As shown, when the check disk 218 is in a closed state, the piston or push rod 412 may be in a neutral position relative to the distal end of the sensor body 418.

It should be appreciated that the check disk 218 may be configured to move along a pre-determined path as indicated by the dashed arrow 230. The piston or push rod 412 may translate the movement of the check disk 218 into motion within the cylindrical liner 414 and relative to the sensor body 418.

As shown in FIG. 8, fluid pressure within the valve chamber 212 has pushed the check disk 218 along the path indicated by the dashed arrow 230, compressing the spring 224 and opening the valve 202. The movement of the check disk 218 caused a corresponding movement of the piston or push rod 412 within the cylindrical liner 414.

It should be appreciated that the piston or push rod 412 may move along the pre-determined path 438 within the cylindrical liner 414. The cylindrical liner 414 may restrict lateral motion of the piston or push rod 412 and may limit lateral movement of the valve piston 406 to ensure that the check disk 218 follows the pre-determined path 438.

The oscillating movement of the valve piston 406 (i.e., the stroke of the valve piston 406) is indicated by the dashed arrow 230. It should be appreciated that the stroke of the valve piston 406 is reflected by a corresponding movement of the piston or push rod 412, as indicated by the dashed arrow 438 and by engagement and disengagement of the check disk 218 with the valve seat 222. This movement of the piston or push rod 412 translates the movement of the valve piston 406 so that the sensor body 418 can sense the relative position of the piston or push rod 412 based on the location along the sensor body 418 where the piston or push rod 412 breaks the electrical field produced by the sensor body 418. The sensor signals from the sensor body 418 may be calibrated against the static position sensor signals of the sensor body 424 to eliminate signal variations attributable to vibration, temperature, pressure, and other parameters.

In the illustrated example, a two-inch diameter valve 402 is shown, which may have an interior pipe diameter that is approximately two inches. Thus, the sensor unit 404 has a height that is at least partially determined by the length of the stroke of the valve piston 406 and by the selected length of the push rod 412 to allow room for the piston or push rod 412 to move along the pre-determined path within the cylindrical liner 414. In an example, the piston or push rod 412 is short enough that, when the valve piston 406 is fully open, the end of the piston or push rod 412 that is closest to the circuit 436 does not interfere with the opening 430. For example, the length of the piston or push rod 412 may be adjusted such that the length of the stroke does not cause the piston or push rod 412 to block the fluid path 430 when the check disk 218 is fully open. Alternatively, the height of the sensor unit 404 may be adjusted to allow for the greater stroke of the valve piston 406 and for the length of the piston or push rod 412. Other adjustments or combinations thereof are also possible.

It should be appreciated that the sensor unit 404 may be adapted to fit other sizes of valves 402 as well. In an example, the sensor unit 404 may be adapted easily for larger diameter valves (such as three-inch valves, four-inch valves, or larger), provided that the sensor unit 404 is sufficiently large to accommodate the length of the stroke of the valve piston 406 and the selected length of the push rod 412. For larger valves, such as six-inch valves, twelve-inch valves, and so on, it may be desirable to adjust the diameter of the piston or push rod 412 and the corresponding size of the cylindrical liner 414 to accommodate the larger piston or push rod 412 to restrain the valve piston from lateral movement in response to fluid pressure. In particular, the diameter of the piston or push rod 412 may be selected to withstand expected peak forces that may be applied to the check disk 218 and the valve piston 406. Further, the length of the piston or push rod 412 may be selected to ensure that the piston or push rod 412 is at least partially within the cylindrical liner 414 for the entire stroke of the valve piston 406 and the check disk 218. The length and diameter of the piston or push rod 412 may be determined based on the expected fluid parameters and the length of the stroke. In some embodiments, the length of the piston or push rod 412 may be two, three, or more times the diameter of the valve. In some implementations, the diameter of the piston or push rod 412 may be selected based on the peak pressures expected to be experienced by the valve piston 406.

In some embodiments, the volume of the chamber or enclosure defined by the cylindrical liner 414 may be approximately equal to the volume of the chamber or enclosure defined by the cylindrical liner 426. Additionally, the fluid path through the dynamic target tube 416 within the piston or push rod 412, the cylindrical liner 414, the fluid path 430, the cylindrical liner 426, the fluid path 432, and a third fluid path 702 may allow the fluid mixture to flow around the sensor body 418 and the sensor body 424 and to return to the fluid mixture within the fluid chamber 212 of the valve 402. In some embodiments, the fluid mixture flow through the fluid path ensures that the sensor bodies 418 and 424 are exposed to the same fluid conditions during operation, such that temperature, pressure, vibration, and other fluid mixture parameters impact measurement signals of both sensors 420 and 422 substantially equally.

It should be appreciated that the dual sensor implementation described above with respect to FIGS. 4 and 7-8 could be implemented differently. In one possible embodiment, the position sensor 420 may be configured to move with the piston or push rod 412, such that the sensor body 418 can maintain a substantially uniform position relative to the piston or push rod 412. In a particular example, the position sensor 420 may be coupled to the piston or push rod 412 and configured to move within the cylindrical liner 414 as the piston and push rod 412 moves back and forth.

In operation, it should be understood that the pressure in the valve 402 may fluctuate with the pumping cycle and with changes in the constituent elements of the fluid mixture. For example, entrained gas within the fluid mixture may expand rapidly as the fluid mixture reaches the valve chamber 212, forcing the check disk 218 to open rapidly, moving the valve piston 406 rapidly. As the gas pressure dissipates, the spring 224 may push the valve piston 406 and the check disk 218 toward the valve seat 222, closing the valve. Liquid components within the fluid mixture may flow less rapidly, causing the check disk 218 and the valve piston 406 to rise and fall more slowly.

The MCU or processor of the circuit 436 may process measurements of the various sensor parameters (including position measurements) over time and may store the measurement data points in a memory of the circuit 436. In some embodiments, the MCU or processor of the circuit 436 may calculate gas volume and liquid volume of a mixture based on the position measurements over time. In a particular example, the expansion of gas components within the fluid mixture may drive the check disk 218 open very quickly, producing much higher frequency variations in the measurements based on the rapid change in position of the piston or push rod 412 relative to the sensor body 418 as compared to the rate of changes in the position of the piston or push rod 412 in response to liquid components of the fluid mixture. In an example, the expansion and release of the entrained gas from the fluid mixture in the fluid chamber 212 of the valve 402 expands to fill the chamber more quickly than the pumped fluid. As a result, entrained gas in the fluid mixture may cause the check valve 218 to open and close rapidly, causing the valve piston 406 to oscillate rapidly as the gas expands and flows out of the fluid chamber 212.

As previously mentioned, seals around the valve piston 406 may be omitted (as compared to conventional valves). The omission of seals around the valve piston 406 within the piston liner 220 allows for less restrained movement of the valve piston 406 within the piston liner 220, which movements contribute to rapid oscillations detected by the position sensors 420 and 422.

It should be appreciated that the sensor body 418 and the sensor body 424 may be implemented by a wire coiled along the length of the sensor body 418 or 424. Electricity flowing through the coiled wire generates an electrical field. At a location along the length of the sensor body 418 or 424 where the piston or push rod 412 or the static target tube 428 overlaps the coiled wires, the piston or push rod 412 or the static target tube 428 interrupts the electrical field, and the location of the interruption can be determined based on the resulting electrical signals. Other embodiments of position sensor types may also be used.

In another possible embodiment, the single-position-channel sensor 420 and the sensor body 418 can be omitted, and the sensor unit 404 may be implemented using a single, dual-position-channel sensor which can sense a static position and a dynamic position concurrently. One possible example of a dual-position-channel sensor is described below with respect to FIG. 9.

Figure 9:
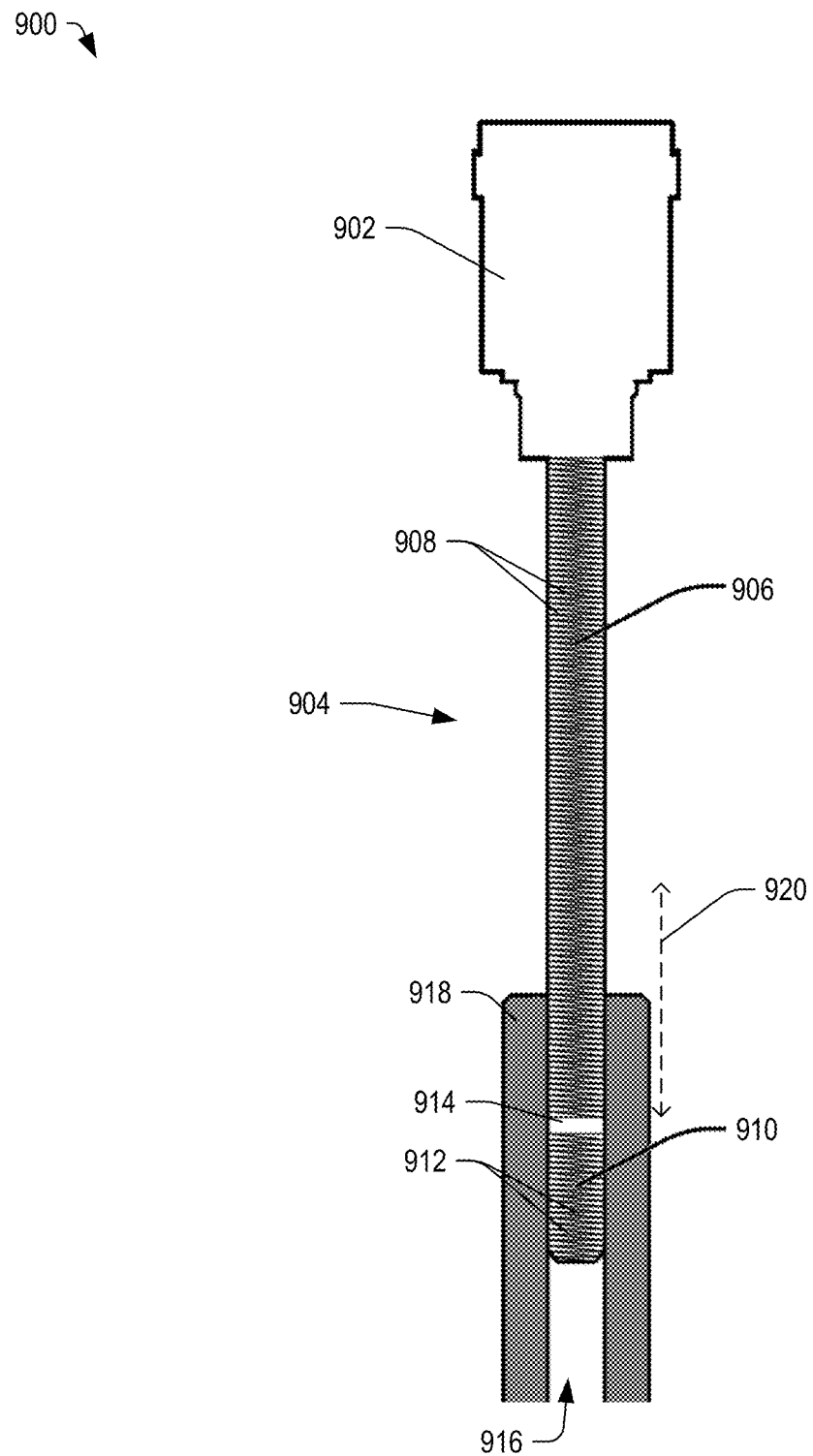
FIG. 9 depicts a dual-position-channel sensor that can be used in the valve units of FIGS. 2 through 5, 7, and 8, in accordance with certain embodiments of the present disclosure.

FIG. 9 depicts a dual-position-channel sensor 900 that can be used in the valve units of FIGS. 2 through 5, 7 and 8, in accordance with certain embodiments of the present disclosure. The dual-position-channel sensor 900 includes a sensor 902 and a sensor body 904. The sensor body 904 includes a first-position-channel sensor 906 formed from a first wire coil 908 and includes a second-position-channel sensor 910 formed from a second wire coil 912. The first-position-channel sensor 906 and the second-position-channel sensor 910 may be separated by an isolation area 914. For example, the isolation area 914 may provide electrical isolation and may separate an electrical field of the first-position-channel sensor 906 from the electrical field of the second-position-channel sensor 910. The sensor body 904 may extend into a lumen or dynamic target tube 916 defined by a push rod 918.

In this example, the piston or push rod 918 may move along a pre-determined path as indicated by the dashed arrow 920. In this example, the second-position-channel sensor 910 may remain within the lumen 916 at all times during operation, providing a consistent electrical signal that can be used as a reference signal. The position of the piston or push rod 918 relative to the first-position-channel sensor 906 may vary with movement of the check disk 218, producing a dynamic position signal that varies over time. Temperature, pressure, and other environmental fluctuations may impact both channel sensors 906 and 910 equally and concurrently, cancelling the influence of such environmental conditions.

The piston or push rod 918, which may be an embodiment of the push rod or piston rod 412 in FIGS. 4, 7, and 8, may move back and forth along the pre-determined path 920, producing a dynamically varying position signal from the first-position-channel sensor 906 and producing a static position reference signal from the second-position-channel sensor 910. Whether the dual-position-channel sensor 900 is used or two different single-position-channel sensors are used (as in the embodiments of FIGS. 4, 7, and 8), the reference signal may be used to remove environmental noise from the dynamic signal, providing a time-varying signal representing the state of the check disk 218. One possible example of the measurement data reflecting a mixture of liquid and gas phase components in the fluid are described below with respect to FIG. 10.

Figure 10:
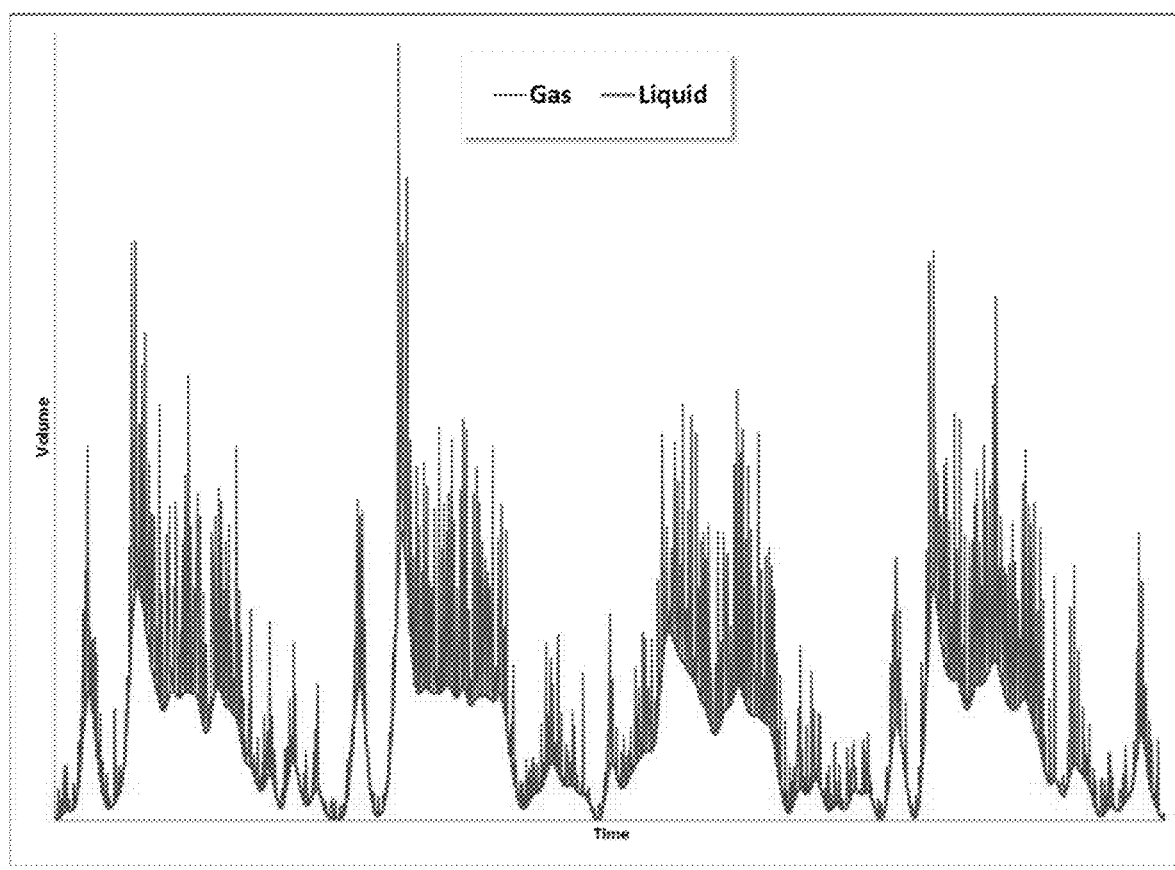
FIG. 10 depicts a line graph of volume versus time for fluid flow through the valve unit of any of FIGS. 2 through 5, 7, and 8 based on the position sensor measurements, in accordance with certain embodiments of the present disclosure.

FIG. 10 depicts a line graph 1000 of volume versus time for fluid flow through the check valve based on the position sensor measurements, in accordance with certain embodiments of the present disclosure. As shown, the fluid volume represents a bottom portion of the line graph 1000, while the peaks represent gas volume. The rapid oscillations depicted within the line graph 1000 may represent rapid engagement and disengagement of the check disk 218 with respect to the valve seat 222 and corresponding movements of the valve piston 406 and the piston or push rod 402. The single-position-channel sensors 420 and 422 (or the dual-position-channel sensor 900) may detect the rapid movements due to expansion of entrained gases and the slower movements attributable to the liquid within the fluid mixture. In this example, the peaks of the movement signals may be used to determine the gas flow and gas volume, and the lower portions of the line graph 1000 may be used to determine the fluid flow and fluid volume. For example, the gas flow may be determined by automatically retrieving the values from one or more lookup tables or data stores, by calculating or computing the gas flow based on the movement signals, or some combination thereof. In a particular implementation, a system may utilize machine learning, artificial intelligence, neural networks, or other automated systems to determine the gas flow and the gas volume.

In additional to the fluid flow, fluid volume, gas flow, and gas volume parameters, the movement data from the single-position-channel sensors 420 and 422 (from one or more dual-position-channel sensors 900, or from a combination of dual-position-channel sensors 900 and single-position-channel sensors) may be configured to detect a stuck valve. In an example, a stuck valve may be reflected by a dynamic sensor signal that remains substantially constant over time. In some embodiments, the state of the check disk (fully open, closed, or partially open) may be determined from the lack of expected signal characteristics normally experienced under active flow conditions. Other embodiments are also possible.

Figure 11:
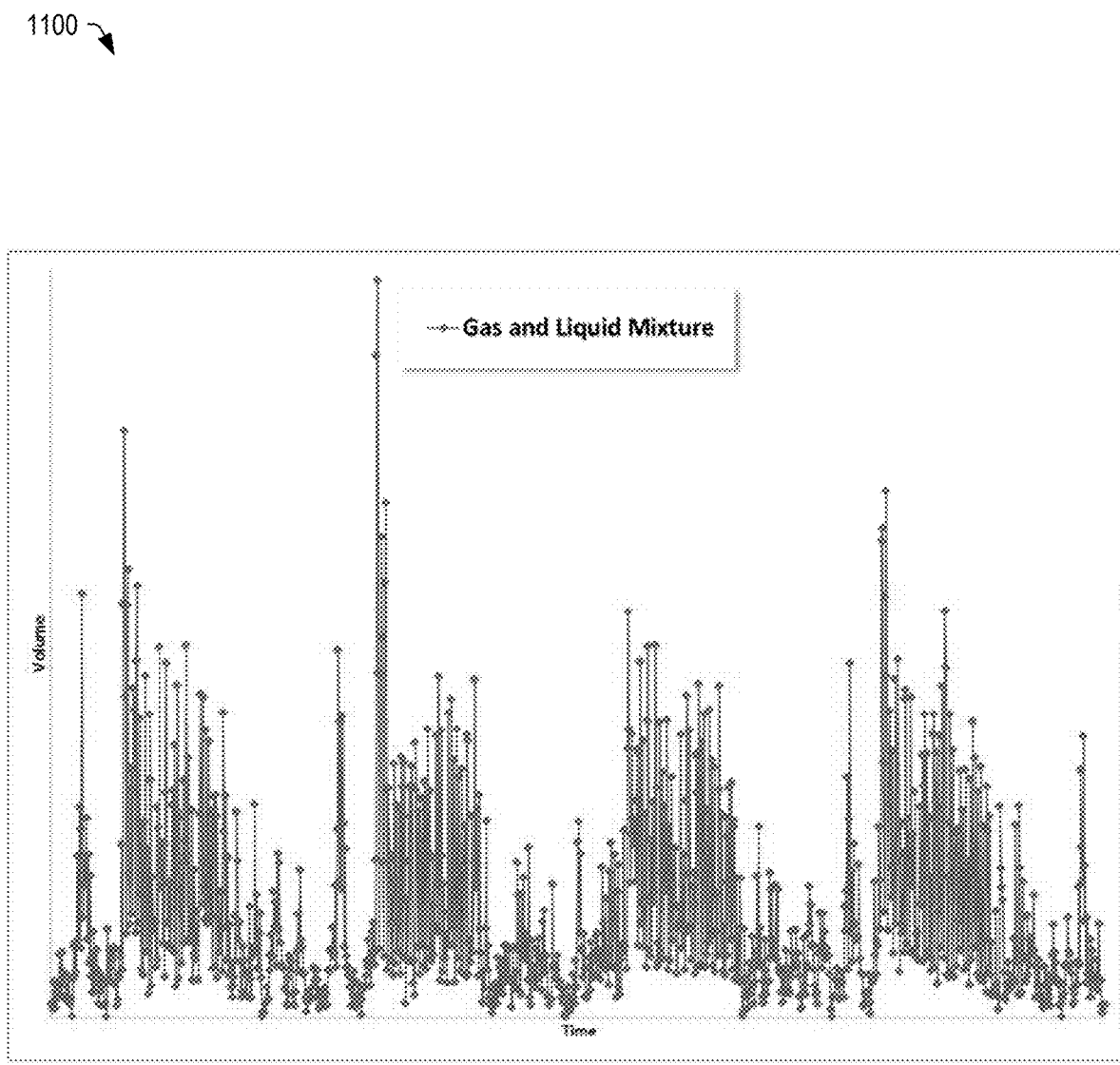
FIG. 11 depicts a point graph of volume versus time for fluid flow through the valve unit of any of FIGS. 2 through 5, 7, and 8 based on the position sensor measurements, in accordance with certain embodiments of the present disclosure.

FIG. 11 depicts a point graph 1100 of volume versus time for fluid flow through the valve based on the position sensor measurements, in accordance with certain embodiments of the present disclosure. In the graph 1100, the high and low measurement data points show sampled position data at various points, reflecting rapid changes in volume over time, which peaks may represent gas components in the fluid, while the lower, more stable data points may represent liquid components in the fluid. In some embodiments, if the position data reflects a lack of expected signal characteristics normally experienced under active flow conditions over time as fluid is being pumped through the valve, these unexpected signal characteristics may indicate that the check disk 218 is stuck. In some embodiments, the state of the check disk 218 (fully open, closed, or partially open) may be determined from the signal amplitude over time. Other embodiments are also possible.

It should be appreciated that the graphs 1000 and 1100 show rapid expansion of entrained gas components of the fluid mixture in the fluid chamber 212 of the valve 402, which may cause the check disk 218 to open and close rapidly. The rapidly changing state of the check disk 218 may cause the first-position-channel sensor 420 to generate an electrical signal having amplitude changes representing a relatively large change in volume over a relatively short period of time, as reflected by the rapid change in the relative position of the piston or push rod 412 or of the check disk 218. In contrast, the liquid phase components of the fluid mixture may cause the first-position-channel sensor 420 to generate an electrical signal having an amplitude that changes more incrementally, reflecting a relatively small change in volume over a relatively large period of time as compared to the expansion of the entrained gas. Such small changes may be determined from slower movements of the check disk 218 over time.

Further, other types of valve structures could be used in conjunction with the piston or rod and in conjunction with the dynamic and static sensor bodies. For example, the sensor unit 404 and the piston or rod 412 may be employed with a swing (flapper) check valve (shown in FIG. 12), a Y-pattern check valve (shown in FIG. 13), other one-way valves, or any combination thereof.

Figure 12:
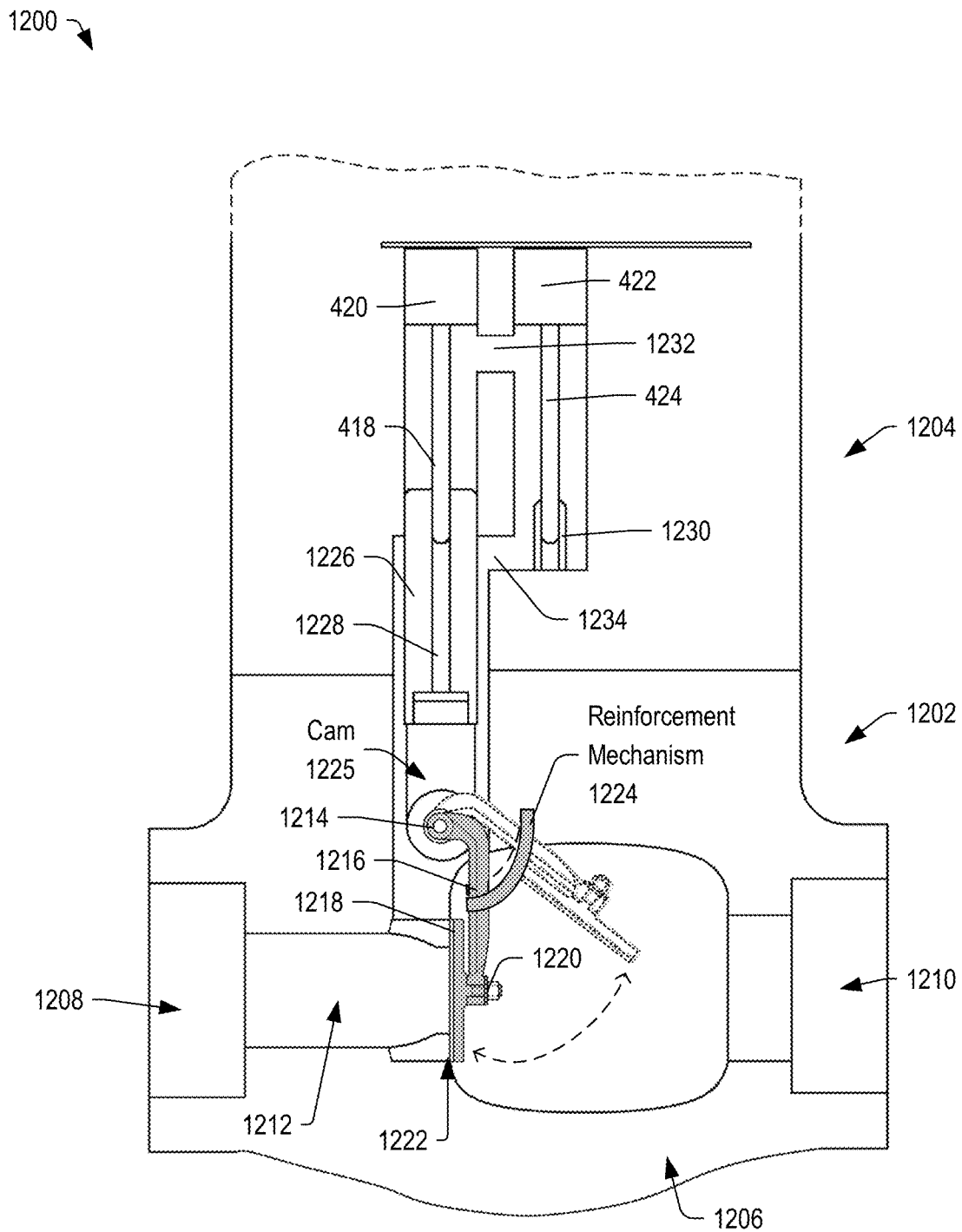
FIG. 12 depicts a diagram of a valve unit including a swing (flapper) check valve and a reinforcement mechanism, in accordance with certain embodiments of the present disclosure.

FIG. 12 depicts a diagram of a valve unit 1200 including a swing (flapper) check valve 1202, in accordance with certain embodiments of the present disclosure. The valve 1202 may be coupled to the sensor unit 1204, which may be an embodiment of the sensor unit 404 of FIG. 4. The sensor assembly 1204 may be configured to determine a position of the check disk 1218. In one possible example, the sensor assembly 1204 may include a rotation-position-sensor configured to determine the movement of the check disk 1218 based on its rotation about a pivot 1214. A rotation-position-sensor can also be referred to as a rotary-encoder or a shaft encoder and is an electro-mechanical device that converts the angular position or motion of a shaft or axle to analog or digital output signals indicative of position. In this example, the check valve 1202 may include an inlet 1208, a fluid chamber 1212, and an outlet 1210. Further, a swing valve 1206 may include a pivot 1214 coupled to a swing arm 1216. The swing arm 1216 may be coupled to a check disk 1218 by a coupling mechanism 1220, such as a bolt. The check disk 1218 may be configured to move within the fluid chamber 1212 between a closed position against the valve seat 1222 and an open position as indicated by the dashed arrow. In some embodiments, a reinforcement mechanism 1224, such as a guide or other mechanical feature, may be included within the fluid chamber 1212 to restrain lateral movement of the swing valve 1206 and to guide the movement of the swing valve 1206 along a pre-determined path. The reinforcement mechanism 1224 may maintain consistent movement of the swing valve 1206 to prevent undesired lateral forces from causing the check disk 1218 from sticking, causing undue pivot wear, or both, thereby increasing the service life of the swing valve 1206.

The swing valve 1206 may include a cam or other device 1225, which may be coupled to the swing arm 1216 or the pivot 1214 such that movement of the swing arm 1216 or rotation about the pivot 1214 is translated into movement of a piston or push rod 1226. The piston or push rod 1226 may define a dynamic target tube 1228 sized to receive a sensor body 418 of a first-position-channel sensor 420. The sensor unit 1204 may include a second-position-channel sensor 422 including a sensor body 424, which may extend into a static target tub 1230. Fluid flow paths 1232 and 1334 may couple the sensor chambers and may allow the fluid mixture to flow around both sensor bodies 418 and 424.

In some embodiments, the swing valve 1206 may swing open in response to fluid pressure and may be biased toward a closed state, when pressure is removed. In some examples, the piston or push rod 1226 may bias the swing arm 1216, causing the swing valve 1206 to close Alternatively, the swing arm 216 or the pivot 1214 may include a spring or other mechanism to bias the check disk 1218 into a closed state. A cam or other device 1224 may translate the rotational movement of the arm 1216 about the pivot 1214 into movement of the piston or push rod 1226. As previously discussed, the sensor body 418 may produce an electrical field, which may be broken at a location along the sensor body 418 about which the piston or push rod 1226 extends. In this example, the first-position-channel sensor 420 is configured to generate a time-varying signal in response to movement of the check disk 1218, and the second-position-channel sensor 422 is configured to produce a static reference signal. In an alternative embodiment, a dual-position-channel sensor 900, such as that shown in FIG. 9, may be used to replace the first and second single-position-channel sensors 420 and 422 and to provide both the dynamic and static reference signals. Other embodiments are also possible.

It should be appreciated that the illustrated example of FIG. 12 represents one possible implementation of a swing check valve 1202 with a corresponding sensor unit 1204. In an alternative embodiment, a rotation-position-sensor may be configured to determine movement of the check disk 1218 based on rotation of the swing arm 1216 about the pivot 1214. Other embodiments are also possible.

Figure 13:
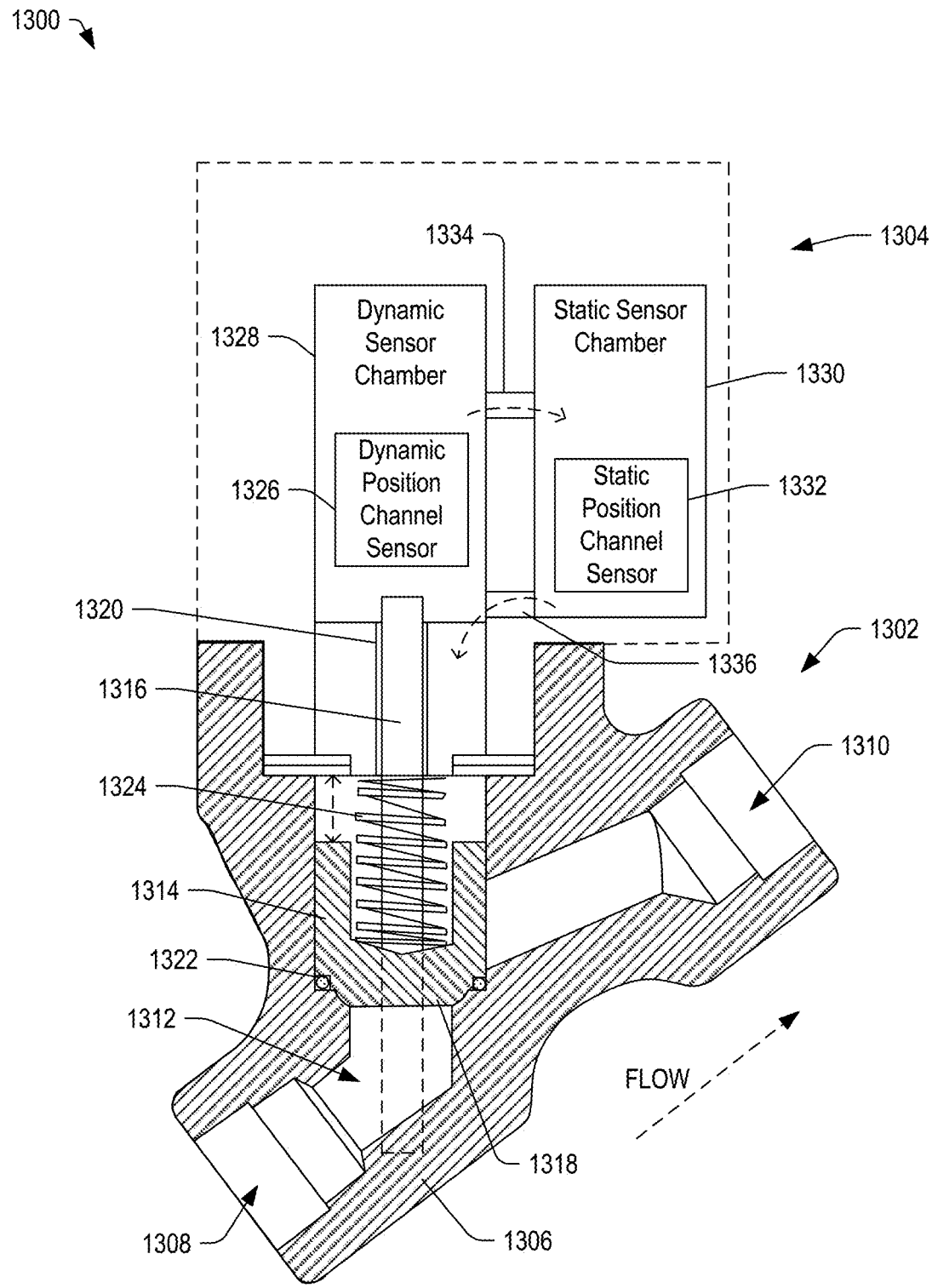
FIG. 13 depicts a diagram of a valve unit including a Y-pattern check valve and a reinforcement mechanism, in accordance with certain embodiments of the present disclosure.

FIG. 13 depicts a diagram of a valve unit 1300 including a Y-pattern check valve 1302, in accordance with certain embodiments of the present disclosure. The valve unit 1300 may further include the sensor assembly 1304, which may be coupled to the check valve 1302. In this example, the check valve 1302 may include an inlet 1308, a fluid chamber 1312, and an outlet 1310. A check disk 1318 may move in response to fluid pressure, and such movement may cause a piston 1316 or other element (not shown) to move away from a valve seat 1322. Further, a spring 1324 may bias the piston 1316 toward the valve seat 1322, when pressure is removed.

The sensor assembly 1304 may include a dynamic-position-channel sensor 1326 within a dynamic sensor chamber (or first chamber) 1328 configured to provide a signal proportional to the position of the check disk 1318 or of the piston or rod. The dynamic-position-channel sensor 1326 may be a single-position-channel sensor 420 or 422 of a dual-position-channel sensor 900, as described above. The sensor assembly 1304 may further include a static sensor chamber (second chamber) 1330 including a static-position-channel sensor 1332 configured to provide a reference signal. The static-position-channel sensor 1332 may be a single-position-channel sensor 420 or 422 of a dual-position-channel sensor 900, as described above. In this example, the dynamic sensor chamber 1328 may be coupled to the static sensor chamber 1330 by a first fluid path 1334 and a second fluid path 1336. By allowing fluid flow across the sensors 1328 and 1332, sensor variations due to fluid pressure and temperature may be consistent across both sensors. Other embodiments are also possible.

Figure 14:
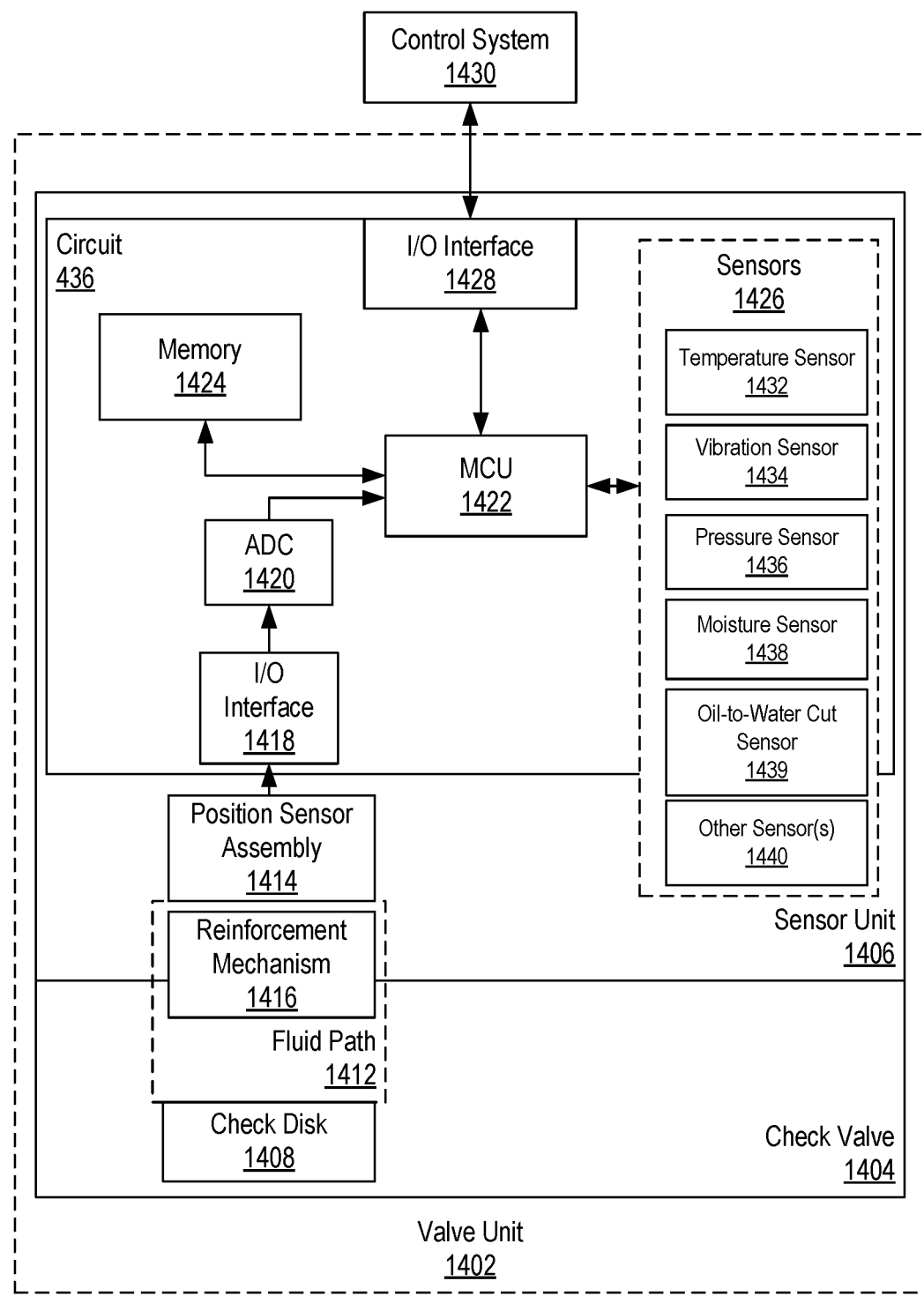
FIG. 14 depicts a block diagram of a system including a valve unit according to any of the embodiments of FIGS. 2-4, 7-8, and 12-13 and including one or more single-position-channel or dual-position-channel sensors, in accordance with certain embodiments of the present disclosure.

FIG. 14 depicts a block diagram of a system 1400 including a valve unit 1402 according to any of the valve units of FIGS. 2 through 4, 7, 8, 12, and 13, in accordance with certain embodiments of the present disclosure. The system 1400 may include a valve unit 1402 including a check valve 1404 coupled to a sensor unit 1406.

The valve 1404 may include a check disk 1408. The check disk 1408 may be a piston check disk, a flapper check disk, a y-pattern check disk, or another type of check disk. In some implementations, the valve 1404 may include a transducer (such as a cam, a piston rod, or another mechanical feature), which may be configured to translate movement of the check disk 1408 into a motion along another path. The valve 1404 may also include a fluid path 1412 that extends into the sensor assembly 1406. Further, the valve 1404 may include a reinforcement mechanism 1416 that may be coupled to the check disk 1408 and that may operate as a guide or restraint to prevent lateral movement of the check disk 1408 and to maintain movement of the check disk 1408 along a pre-determined path.

The sensor assembly 1406 may include a position sensor assembly 1414 including a corresponding one or more sensor bodies, which may be configured to generate electrical signals proportional to the motion of the check disk 1408. The sensor bodies may be exposed to the fluid mixture from the fluid path 1412. The position sensor assembly 1414 may include first- and second-position-channel sensors (as shown in FIGS. 2 through 4, 7, 8, and 12-13) or may include one or more dual-position-channel sensors (as shown in FIG. 9).

The circuit 436 may include an analog-to-digital converter (ADC) 1420 including an input coupled to the I/O interface 1418 and an output coupled to a microcontroller unit (MCU) 1422 (or a processor). The circuit 436 may further include a memory 1424 coupled to the MCU 1422 and configured to store data as well as instructions that can be executed by the MCU 1422. The circuit 436 may also include a plurality of sensors 1426 and an I/O interface 1428 configured to communicate data to a control system 1430. The sensors 1426 may include one or more temperature sensors 1432, one or more vibration sensors 1434, one or more pressure sensors 1436, one or more moisture sensors 1438, oil-to-water cut sensors 1439, one or more other sensors 1440, or any combination thereof. The sensors 1426 are depicted inside of a dashed box to indicate that one or more of the sensors 1426 may be mounted to the circuit 436, while others of the sensors 1426 may be coupled to but separate from the circuit 436. For example, a temperature sensor 1432 may be mounted to the circuit 436 to measure air temperature, while a second temperature sensor 1430 may be within the fluid path 1412 to measure fluid temperature. Other implementations are also possible.

In operation, the check disk 1408 may open and close the valve 1404. Movement of the check disk 1408 may be measured by the position sensor assembly 1414. If the output signals of any of the sensors are analog in nature, then an Analog-to-Digital Converter (ADC), such as ADC 1420, may be included to convert these analog signals into digital signals that can be used by the MCU 1422. As an example, the ADC 1420 may convert analog signals from the position sensor assembly 1414 into digital samples, which may be provided to the MCU 1422. The MCU 1422 may be coupled to the memory 1424, which may store data captured from the position sensor assembly 1414. Further, the memory 1424 may store instructions that, when executed, may cause the MCU 1422 (or another processor) to determine a position data associated with the check disk 1408 based on the signals from the position sensor assembly 1414. The MCU 1422 may communicate data to and receive data and instructions from the control system 1430 via the I/O interface 1428. In some embodiments, the control system 1430 may be a computing device. The I/O interface 1428 may include a transceiver configured to send and receive data through a wired connection, such as a controller area network (CAN) bus, a serial bus, an Ethernet cable, Modbus, a wired or wireless network, or any combination thereof, or any other data distribution method. In some embodiments, the MCU 1422 may be programmable via instructions received at the I/O interface 1428 and demodulated by the transceiver.

In some embodiments, the MCU 1422 may receive dynamic position data and reference data from the position sensor assembly 1414 through the ADC 1420. The dynamic position data may represent a position of the check disk 1408 relative to a sensor body of the position sensor assembly 1414. Alternatively, the dynamic position data may represent a position of a piston rod or push rod coupled to the check disk 1408. The MCU 1422 may also receive reference data from the position sensor assembly 1414 through the ADC 1420. In some embodiments, a reference signal from the position sensor assembly 1414 may be based on the sensor body (or a portion thereof) extending into a static target tube to produce a static reference signal. The MCU 1422 may compare the reference signal against the dynamic signal to eliminate noise due to temperature drift, pressure variations, environmental noise, other factors, or any combination thereof. Since the position sensor assembly 1414 may be exposed to the same fluid mixture via the fluid path 1412, environmental factors that might otherwise impact the accuracy of the measurement can be cancelled out since those factors impact both position sensors, equally.

The MCU 1422 may be configured to determine flow data associated with liquid components and gas components of the fluid flowing through the valve 1404. In particular, gas volume may be determined based on measurement data showing short duration and high amplitude changes in the position of the check disk 1408, while liquid volume can be determined from measurement data showing longer duration and lower amplitude changes in the position of the check disk 1408. These duration and amplitude change characteristics of gas and fluid may be run through mathematical filters designed to separate the two phenomena into separate flow channel streams. The flow data may be provided to the control system 1430 through the I/O interface 1428. Other embodiments are also possible.

In some embodiments, when the MCU 1422 determines that the position sensor signal characteristics are substantially constant or frozen (unchanging) over a period of time, the MCU 1422 may detect a stuck valve, a non-operational pump, a pipeline leak, or any other condition that prohibits the check valve from operating as expected, and may generate an alert that can be sent to the control system 1430 indicating that maintenance may be needed. In a particular example, the lack of any amplitude changes of the position sensor signal may indicate the state of the check disk 1408 (fully open, closed, or partially open). In some embodiments, the position of the check disk 1408 can be determined with specificity. Other embodiments are also possible.

Figure 15:
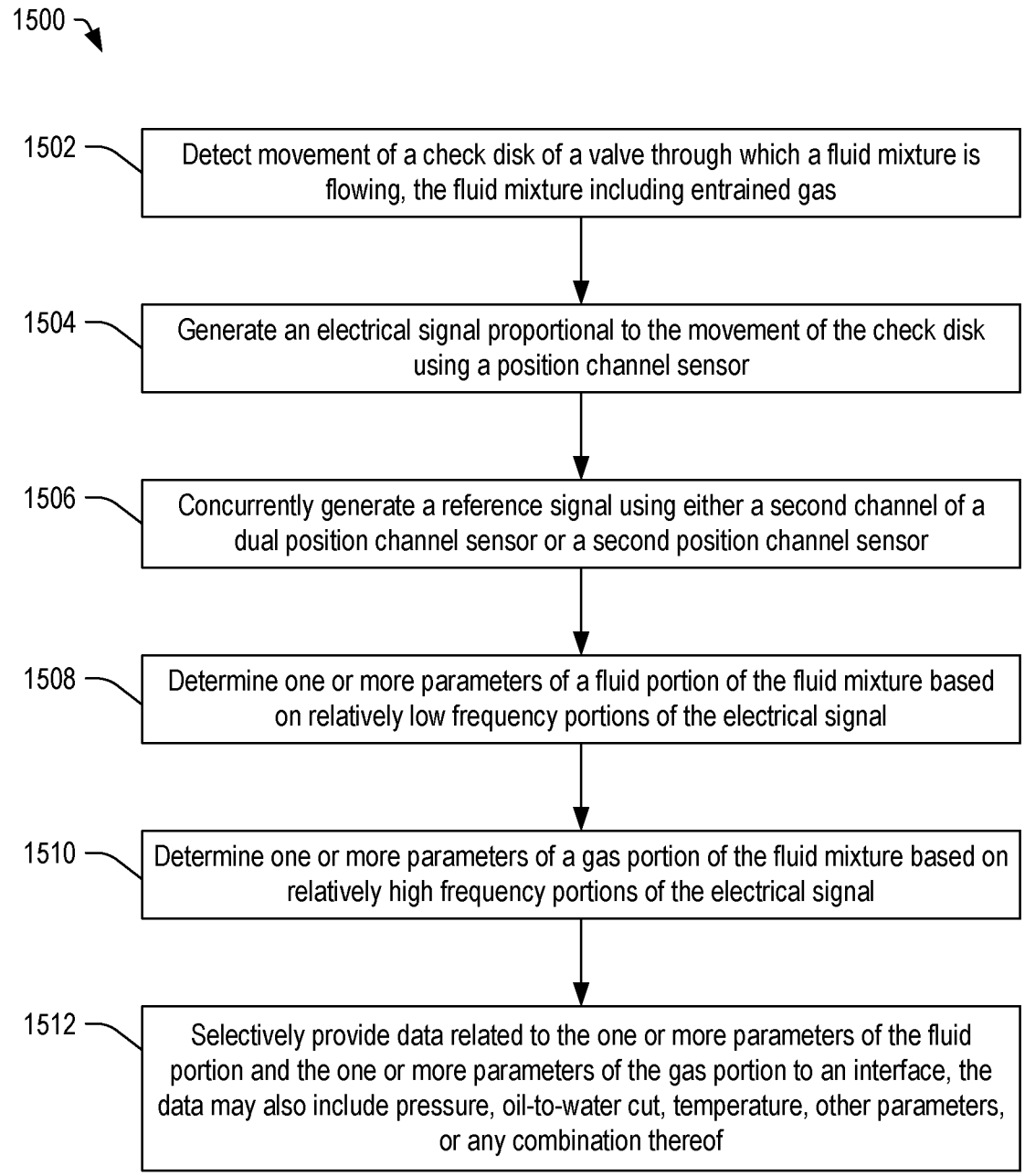
FIG. 15 depicts a method of determining parameters of fluid and of entrained gas within a fluid mixture based on movement of a check disk of a valve, in accordance with certain embodiments of the present disclosure.

FIG. 15 depicts a method 1500 of determining parameters of fluid and of entrained gas within a fluid mixture based on movement of a check disk of a valve, in accordance with certain embodiments of the present disclosure. At 1502, the method 1500 can include detecting movement of a check disk of a valve through which a fluid mixture is flowing, where the fluid mixture includes entrained gas. The check disk may be included in any type of valve, and the movement may be translated by a cam, a piston, another device, or any combination thereof, which may be used to convert the opening/closing movement of the check disk into motion.

At 1504, the method 1500 can include generating an electrical signal proportional to the movement of the check disk using a position sensor. In some embodiments, the position sensor may fit within a lumen (dynamic target tube) defined by a piston or push rod that provides the motion translation from the check disk.

At 1506, the method 1500 may include concurrently generating a reference signal using either the second channel of a dual-position-channel sensor or a second single-position-channel sensor. At 1508, the method 1500 can include determining one or more parameters of a fluid portion of the fluid mixture based on relatively low frequency portions of the electrical signal. At 1510, the method 1500 may include determining one or more parameters of a gas portion of the fluid mixture based on relatively high frequency portions of the electrical signal.

At 1512, the method 1500 may include selectively providing data related to the one or more parameters of the fluid portion and the one or more parameters of the gas portion to an interface. The parameters may be communicated to a computing device via the interface. The parameters may include an indication that the check disk is stuck. In some embodiments, the parameters may include data indicating the volume of gas and the volume of liquid that passes through the valve. Other parameters along with associated data related to the fluid mixture are also possible, such as pressure, oil-to-water cut, temperature, other parameters, or any combination thereof. In some implementations, the data may include the other parameters as well as data related to the fluid and gas portions. Other embodiments are also possible.

In conjunction with the systems, devices, and methods described above with respect to FIGS. 1-15, a valve unit is disclosed that can include a valve that may be configured to operate over extended periods of time without sticking and without requiring maintenance. The valve may include a check disk configured to move relative to a valve seat to open and close a valve. The valve may further include a reinforcement mechanism coupled to the check disk and configured to constrain movement of the check disk along a pre-determined path. In some embodiments, the mechanism can operate to prevent the check disk from sticking due to debris, for example. In a particular example, the mechanism (such as a guide, or a push rod in conjunction with a cylinder) may reinforce and restrain lateral movement of the check disk to ensure that fluid pressure, debris, fluid contaminates, and other restrictive phenomenon pumped through the valve do not cause the check disk to stick or otherwise fail, thereby reducing the frequency of maintenance needed to keep the check disk operational.

In some embodiments, the valve may be coupled to a sensor assembly. The sensor assembly may include a position sensor configured to determine movement of the check disk. The position sensor may be configured to produce a signal proportional to a position of the check disk. In some embodiments, the sensor assembly may include a second-position-channel sensor configured to provide a reference position signal. In other embodiments, the position sensor may be implemented as one or more dual-position-channel sensor configured to produce both the signal proportional to the position of the check disk and a static reference signal. A fluid passage may allow at least a portion of the fluid mixture from the valve to flow around the one more position sensors.

In some embodiments, the sensor assembly may include a processor (such as an MCU) configured to determine volume of gas and volume of liquid passing through the fluid chamber of the valve over time as a function of the position of the check disk. In an example, rapid expansion of gas phase components may cause the valve piston and the check disk to oscillate (open and close) rapidly, while fluid phase components of the fluid may vary more stably over time, providing slower changes in terms of the valve opening and closing. Near instantaneous changes in fluid volume measurements based on the position of the valve piston and check valve may represent gas expansion in the fluid chamber, while slower changes may represent liquid phase components of the fluid. The processor or MCU may be configured to determine the flow volume of liquid components and gas components based on the motion data. Other embodiments are also possible.

It should be appreciated that, while the above examples have largely been directed to check valve assemblies, the measurement capabilities of the sensor assembly may be applied in conjunction with other types of couplings to detect flow. Other embodiments are also possible.

Although the present invention has been described with reference to preferred embodiments, workers skilled in the art will recognize that changes may be made in form and detail without departing from the scope of the invention.

What is claimed is:

1. A valve unit comprising:
  a valve configured to receive a fluid mixture, the valve including:
    a housing including a valve portion and a sensor portion, the valve portion defining a flow fluid path including an inlet, a fluid chamber, and an outlet, the housing including a valve seat;
    a check disk configured to move along a pre-determined path to contact the valve seat in a closed state and configured to decouple from the valve seat in an open state;
    a reinforcement mechanism coupled to the check disk and configured to restrain lateral movement of the check disk to prevent the check disk from becoming stuck; and
  a sensor assembly within the sensor portion of the housing, the sensor assembly comprising:
    one or more position sensors configured to generate electrical signals related to movement of the check disk; and
    circuitry coupled to the one or more position sensors and configured determine movement of the check disk based on the electrical signals and to determine fluid flow parameters of the fluid mixture based on frequency components within the electrical signals.

2. The valve unit of claim 1, wherein the fluid flow parameters include:
  a first flow volume of liquid components of the fluid mixture; and a second flow volume of gas components of the fluid mixture.

3. The valve unit of claim 1, wherein the one or more position sensors includes:
a first-position-channel sensor configured to generate a first electrical signal of the electrical signals corresponding to movement of the check disk; and
a second-position-channel sensor configured to generate the second electrical signal of the electrical signals representing a static reference signal.

4. The valve unit of claim 1, wherein the reinforcement mechanism comprises:
a valve piston coupled to the check disk; and
a push rod coupled to the valve piston and configured to move along the pre-determined path in response to movement of the check disk.

5. The valve unit of claim 4, wherein:
the valve piston includes an opening configured to allow a portion of a fluid mixture from the fluid chamber to flow into the sensor portion of the housing and around a portion of the sensor assembly;
the push rod defines a lumen including a first end to receive the portion of the fluid mixture from the opening and including a second end; and
the housing includes a liner sized to receive the piston rod and to restrain lateral movement of the piston rod.

6. The valve unit of claim 5, further comprising the sensor assembly including a position sensor including a sensor body sized to fit into the second end of the lumen and to generate an electrical signal proportional to a position of the push rod along a length of the sensor body, the electrical signal related to a position of the check disk.

7. The valve unit of claim 6, wherein the sensor assembly further includes a second-position-channel sensor including a sensor body sized to fit within a static target tube and configured to generate a static reference signal.

8. The valve unit of claim 5, wherein the sensor assembly comprises a dual-position-channel sensor comprising:
a first-position-channel sensor extending at least partially into the lumen of the push rod and configured to produce a time-varying electrical signal indicative of a position of the check disk based on a position of the push rod relative to the first-position-channel sensor; and
a second-position-channel sensor within the lumen and configured to produce a static electrical signal.

9. The valve unit of claim 1, wherein the circuitry determines:
the first flow volume based on relatively low frequency components of the first electrical signal; and
the second flow volume based on relatively high frequency components of the first electrical signal.

10. The valve unit of claim 1, wherein:
the fluid mixture includes liquid, debris, and entrained gas;
the fluid flow parameters of the fluid mixture comprise:
a volume of entrained gas within the fluid mixture based on relatively high frequency components of the electrical signals;
a volume of liquid within the fluid mixture based on relatively low frequency components of the electrical signals.

11. A valve unit comprising:
a valve including:
a housing defining a flow fluid path including an inlet, a fluid chamber, and an outlet, the housing including a valve seat;
a check disk configured to move along a pre-determined path to contact the valve seat in a closed state and configured to decouple from the valve seat in an open state in response to receiving a fluid mixture;
a reinforcement mechanism coupled to the check disk and configured to restrict lateral movement of the check disk; and
a sensor assembly coupled to the valve, the sensor assembly including:
one or more position sensors configured to generate a first electrical signal related to a position of the check disk and a second electrical signal representing a static reference signal; and
circuitry coupled to the one or more position sensors and configured to determine fluid flow parameters including a first flow volume of liquid components of the fluid mixture and a second flow volume of gas components of the fluid mixture based on frequency components within the first electrical signal.

12. The valve unit of claim 11, wherein the circuitry determines:
the first flow volume based on relatively low frequency components of the first electrical signal; and
the second flow volume based on relatively high frequency components of the first electrical signal.

13. The valve unit of claim 11, wherein the one or more position sensors includes:
a first-position-channel sensor configured to generate the first electrical signal; and
a second-position-channel sensor associated with a static target tube and configured to generate the second electrical signal.

14. The valve unit of claim 11, wherein the reinforcement mechanism comprises:
the valve piston includes an opening configured to allow a portion of a fluid mixture from the fluid chamber to flow around the one or more position sensors of the sensor assembly;
a piston rod configured to move in response to the movement of the check disk, the piston rod including a dynamic target tube configured to receive the at least one position sensor; and
wherein the housing includes a liner sized to receive the piston rod and to restrain lateral movement of the piston rod.

15. The valve unit of claim 11, wherein:
the first flow volume of liquid components of the fluid mixture is determined based on relatively low frequency components of the first electrical signal; and
the second flow volume of gas components of the fluid mixture is determined based on relatively high frequency components of the first electrical signal.

16. A valve unit comprising:
a valve including:
a housing defining a flow fluid path including an inlet, a fluid chamber, and an outlet, the housing including a valve seat;
a check disk configured to move along a pre-determined path to contact the valve seat in a closed state and configured to decouple from the valve seat in an open state, the check disk configured to open and close in response to fluid pressure from a fluid mixture including liquid, debris, and entrained gas;
a reinforcement mechanism coupled to the check disk and configured to restrain lateral movement of the check disk; and a sensor assembly coupled to the valve, the sensor assembly including:
  a first position sensor configured to generate a first electrical signal related to movement of the check disk;
  a second position sensor configured to generate a reference signal; and
  circuitry coupled to the first and second position sensors and configured to determine noise in the first electrical signal based on the reference signal, the circuitry to determine a volume of entrained gas within the fluid mixture based on relatively high frequency components of the first electrical signal and to determine a volume of liquid within the fluid mixture based on relatively low frequency components of the first electrical signal.

17. The valve unit of claim 16, wherein the circuitry is configured to determine the check disk is stuck when the first electrical signal remains constant for a period of time greater than a threshold time while the fluid mixture is flowing through the valve.

18. The valve unit of claim 16, wherein the reinforcement mechanism further comprises:
  a liner within the housing;
  a push rod coupled to the check disk and configured to fit within the liner, the push rod including a lumen defining a dynamic target tube configured to receive one or more of the first position sensor and the second position sensor;
  wherein the push rod moves along a pre-determined path within the liner in response to movement of the check disk;
  wherein the first position sensor extends at least partially into the lumen and generates the electrical signal in proportion to a position of the push rod within the liner; and
  wherein the push rod and the liner cooperate to restrain lateral movement of the check disk to prevent sticking.

19. The valve unit of claim 16, wherein the second position sensor includes a sensor body sized to fit within a static target tube of the housing.

* * * * *